United States Patent
Wright et al.

(10) Patent No.: US 8,506,745 B2
(45) Date of Patent: Aug. 13, 2013

(54) METHOD OF SEALING RECLOSABLE FASTENERS

(76) Inventors: Donald K. Wright, Murphysboro, IL (US); Christopher L. Pemberton, Marion, IL (US); James K. Hankins, Harrisburg, IL (US)

( * ) Notice: Subject to any disclaimer, the term of this patent is extended or adjusted under 35 U.S.C. 154(b) by 778 days.

(21) Appl. No.: 11/279,475

(22) Filed: Apr. 12, 2006

(65) Prior Publication Data
US 2006/0201626 A1  Sep. 14, 2006

Related U.S. Application Data

(60) Division of application No. 10/286,645, filed on Nov. 2, 2002, now Pat. No. 7,067,037, which is a continuation-in-part of application No. 09/415,696, filed on Oct. 12, 1999, now abandoned, and a continuation-in-part of application No. 10/039,527, filed on Nov. 7, 2001, now Pat. No. 6,863,754.

(51) Int. Cl.
| | |
|---|---|
| B29C 65/00 | (2006.01) |
| B29C 59/04 | (2006.01) |
| B30B 5/02 | (2006.01) |
| C04B 33/34 | (2006.01) |

(52) U.S. Cl.
USPC ........... 156/269; 156/359; 156/367; 156/209; 156/530; 156/583.91; 156/583.1; 156/515; 156/89.22

(58) Field of Classification Search
None
See application file for complete search history.

(56) References Cited

U.S. PATENT DOCUMENTS

| | | | |
|---|---|---|---|
| 2,589,756 | A | 3/1952 | Waters |
| 2,780,261 | A | 2/1957 | Svec et al. |
| 2,975,769 | A | 4/1961 | Harrah |
| 2,994,469 | A | 8/1961 | Yroup et al. |
| 3,122,807 | A | 3/1964 | Ausnit |
| 3,172,443 | A | 3/1965 | Ausnit |
| 3,173,184 | A | 3/1965 | Ausnit |
| 3,181,583 | A | 5/1965 | Lingenfelter |
| 3,266,985 | A | 8/1966 | Spees |
| 3,410,745 | A | 11/1968 | Canepa |
| 3,426,959 | A | 2/1969 | Lemelson |
| 3,532,571 | A | 10/1970 | Ausnit |

(Continued)

FOREIGN PATENT DOCUMENTS
| | | |
|---|---|---|
| EP | 0446760 A1 | 9/1991 |
| EP | 0510797 A1 | 10/1992 |

(Continued)

OTHER PUBLICATIONS

"Matrix" Merriam-Webster Online Dictionary. 2005. Http://merriam-webster.com (May 23, 2005).

(Continued)

*Primary Examiner* — Philip Tucker
*Assistant Examiner* — Alex Efta

(57) ABSTRACT

A modular reciprocating heat seal jaw assembly is disclosed for sealing reclosable fastener strips to a web of thermoplastic film and for sealing the web of thermoplastic film into a series of reclosable bags. The jaw assembly includes first and second sealing jaws and means for slidably mounting the sealing jaws on a pair of parallel shafts near the lateral ends of the first and second sealing jaws in a horizontal configuration. A method of performing the sealing of the fastener strips and web thermoplastic film into a series of reclosable bags is also disclosed.

2 Claims, 16 Drawing Sheets

(56) References Cited

U.S. PATENT DOCUMENTS

| | | | |
|---|---|---|---|
| 3,557,413 | A | 1/1971 | Engle |
| 3,608,439 | A | 9/1971 | Ausnit |
| 3,713,923 | A | 1/1973 | LaGuerre |
| 3,723,225 | A | 3/1973 | Canepa |
| 3,806,998 | A | 4/1974 | LaGuerre |
| 3,827,472 | A | 8/1974 | Uramoto |
| 3,932,257 | A | 1/1976 | Noguchi |
| 3,948,705 | A | 4/1976 | Ausnit |
| 3,984,600 | A | 10/1976 | Kawase et al. |
| 3,986,914 | A | 10/1976 | Howard |
| 3,999,255 | A | 12/1976 | Warburton et al. |
| 4,002,519 | A | 1/1977 | Moseley et al. |
| 4,019,819 | A | 4/1977 | Lodzinski |
| 4,094,729 | A | 6/1978 | Boccia |
| 4,191,230 | A | 3/1980 | Ausnit |
| 4,196,030 | A | 4/1980 | Ausnit |
| 4,212,337 | A | 7/1980 | Kamp |
| 4,246,288 | A | 1/1981 | Sanborn, Jr. |
| 4,310,885 | A | 1/1982 | Azcua et al. |
| 4,335,817 | A | 6/1982 | Bahr |
| 4,352,654 | A | 10/1982 | Heimberger |
| 4,514,962 | A | 5/1985 | Ausnit |
| 4,549,925 | A | 10/1985 | Goguen |
| 4,555,282 | A | 11/1985 | Yano |
| 4,570,820 | A | 2/1986 | Murphy |
| 4,589,145 | A | 5/1986 | Van Erden |
| 4,617,683 | A | 10/1986 | Christoff |
| 4,655,862 | A | 4/1987 | Christoff et al. |
| 4,662,978 | A | 5/1987 | Oki |
| 4,682,366 | A | 7/1987 | Ausnit et al. |
| 4,703,518 | A | 10/1987 | Ausnit |
| 4,703,619 | A | 11/1987 | Chujo et al. |
| 4,759,642 | A | 7/1988 | Van Erden et al. |
| 4,773,780 | A | 9/1988 | Hochgesang |
| 4,782,951 | A | 11/1988 | Griesbach |
| 4,786,190 | A | 11/1988 | Van Erden et al. |
| 4,787,755 | A | 11/1988 | Branson |
| 4,790,126 | A | 12/1988 | Boeckmann |
| 4,798,041 | A | 1/1989 | Bentsen |
| 4,807,300 | A | 2/1989 | Ausnit et al. |
| 4,832,505 | A | 5/1989 | Ausnit et al. |
| 4,844,759 | A | 7/1989 | Boeckmann |
| 4,846,928 | A | 7/1989 | Ausnit |
| 4,848,928 | A | 7/1989 | Ausnit |
| 4,874,257 | A | 10/1989 | Inagald |
| 4,876,842 | A | 10/1989 | Ausnit |
| 4,878,987 | A | 11/1989 | Ven Erden |
| 4,882,356 | A | 11/1989 | Nassar et al. |
| 4,892,512 | A | 1/1990 | Branson |
| 4,909,017 | A | 3/1990 | McMahon et al. |
| 4,909,870 | A | 3/1990 | Gould et al. |
| 4,925,316 | A | 5/1990 | Van Erden |
| 4,929,225 | A | 5/1990 | Ausnit |
| 5,007,142 | A | 4/1991 | Herrington |
| 5,007,143 | A | 4/1991 | Herrington |
| 5,010,627 | A | 4/1991 | Herrington et al. |
| 5,014,498 | A | 5/1991 | McMahon |
| 5,020,194 | A | 6/1991 | Herrington et al. |
| 5,022,530 | A | 6/1991 | Zieke |
| 5,026,563 | A | 6/1991 | Van Erden et al. |
| 5,035,517 | A | 7/1991 | Edelman |
| 5,050,736 | A | 9/1991 | Griesbach et al. |
| 5,063,069 | A | 11/1991 | Van Erden et al. |
| 5,063,644 | A | 11/1991 | Herrington et al. |
| 5,067,208 | A | 11/1991 | Herrington, et al. |
| 5,070,584 | A | 12/1991 | Dais et al. |
| 5,091,036 | A | 2/1992 | Taylor |
| 5,096,516 | A | 3/1992 | McDonald et al. |
| 5,116,140 | A | 5/1992 | Hirashima |
| 5,131,121 | A | 7/1992 | Herrington, Jr. et al. |
| 5,138,750 | A | 8/1992 | Gundlach et al. |
| 5,140,727 | A | 8/1992 | Dais et al. |
| 5,157,811 | A | 10/1992 | Bodolay |
| 5,186,543 | A | 2/1993 | Cochran |
| 5,211,482 | A | 5/1993 | Tilman |
| RE34,347 | E | 8/1993 | Van Erden |
| 5,273,511 | A | 12/1993 | Boeckman |
| 5,283,932 | A | 2/1994 | Richardson |
| 5,301,394 | A | 4/1994 | Richardson |
| 5,307,552 | A | 5/1994 | Dais et al. |
| 5,335,997 | A | 8/1994 | Kanemitsu et al. |
| 5,369,847 | A | 12/1994 | Naya |
| RE34,905 | E | 4/1995 | Ausnit |
| 5,403,094 | A | 4/1995 | Tomic |
| 5,405,561 | A | 4/1995 | Dais et al. |
| 5,417,495 | A | 5/1995 | Branson |
| 5,435,864 | A | 7/1995 | Machacek |
| 5,442,837 | A | 8/1995 | Morgan |
| 5,442,838 | A | 8/1995 | Richardson |
| 5,461,845 | A | 10/1995 | Yeager |
| 5,462,360 | A | 10/1995 | Tilman et al. |
| 5,482,375 | A | 1/1996 | Richardson et al. |
| 5,513,592 | A | 5/1996 | Cotton |
| 5,525,363 | A | 6/1996 | Herber et al. |
| 5,540,425 | A | 7/1996 | Graef |
| 5,542,777 | A | 8/1996 | Johnson |
| 5,557,907 | A | 9/1996 | Malin |
| 5,558,439 | A | 9/1996 | Tilman |
| 5,564,259 | A * | 10/1996 | Stolmeier ................. 53/410 |
| 5,592,802 | A | 1/1997 | Malin |
| 5,601,368 | A | 2/1997 | Bodolay et al. |
| 5,638,586 | A | 6/1997 | Malin et al. |
| 5,647,100 | A | 7/1997 | Porchia et al. |
| 5,664,299 | A | 9/1997 | Porchia et al. |
| 5,700,340 | A | 12/1997 | Johnson et al. |
| 5,713,669 | A * | 2/1998 | Thomas et al. ............ 383/204 |
| 5,715,580 | A | 2/1998 | Johnson, III |
| 5,729,978 | A | 3/1998 | Hiereth et al. |
| 5,747,126 | A | 5/1998 | Van Erden et al. |
| 5,777,305 | A | 7/1998 | Smith et al. |
| 5,782,733 | A | 7/1998 | Yeager |
| 5,806,984 | A | 9/1998 | Yeager |
| 5,823,933 | A | 10/1998 | Yeager |
| 5,827,163 | A | 10/1998 | Kettner |
| 5,829,884 | A | 11/1998 | Yeager |
| 5,849,003 | A | 12/1998 | Olsen et al. |
| 5,895,552 | A | 4/1999 | Matsuguchi |
| 5,900,047 | A | 5/1999 | Rodriguez et al. |
| 5,927,836 | A | 7/1999 | Herr et al. |
| 5,930,983 | A | 8/1999 | Terminella et al. |
| 5,934,806 | A | 8/1999 | Tomic |
| 5,951,453 | A | 9/1999 | Yeager |
| 5,953,796 | A | 9/1999 | McMahon et al. |
| 5,954,433 | A | 9/1999 | Yeager |
| 6,000,197 | A | 12/1999 | Ausnit |
| 6,003,592 | A | 12/1999 | Yamamoto |
| 6,014,795 | A | 1/2000 | McMahon et al. |
| 6,019,512 | A | 2/2000 | Yeager |
| 6,033,113 | A | 3/2000 | Anderson |
| 6,039,525 | A | 3/2000 | Johnson |
| 6,040,033 | A | 3/2000 | Johnson |
| 6,059,457 | A | 5/2000 | Sprehe et al. |
| 6,059,503 | A | 5/2000 | Johnson |
| 6,063,224 | A | 5/2000 | Tomic et al. |
| 6,079,878 | A | 6/2000 | Yeager |
| 6,085,491 | A * | 7/2000 | Bois ........................ 53/412 |
| 6,088,998 | A * | 7/2000 | Malin et al. ............... 53/416 |
| 6,110,586 | A | 8/2000 | Johnson |
| 6,112,374 | A | 9/2000 | Van Erden |
| 6,116,314 | A | 9/2000 | Johnson |
| 6,131,369 | A | 10/2000 | Ausnit |
| 6,131,370 | A | 10/2000 | Ausnit |
| 6,138,329 | A | 10/2000 | Johnson |
| 6,138,436 | A | 10/2000 | Malin et al. |
| 6,145,385 | A | 11/2000 | Johnson |
| 6,152,601 | A | 11/2000 | Johnson |
| 6,174,397 | B1 | 1/2001 | Johnson |
| 6,177,172 | B1 | 1/2001 | Yeager |
| 6,178,722 | B1 | 1/2001 | McMahon |
| 6,185,907 | B1 | 2/2001 | Malin |
| 6,216,423 | B1 | 4/2001 | Thieman |
| 6,224,262 | B1 | 5/2001 | Hogan et al. |
| 6,251,209 | B1 | 6/2001 | Johnson |
| 6,299,720 | B1 | 10/2001 | Van Erden |

| | | |
|---|---|---|
| 6,321,423 B1 | 11/2001 | Johnson |
| 6,350,340 B1 | 2/2002 | Johnson |
| 6,357,914 B1 | 3/2002 | Kinigakis |
| 6,361,212 B1 | 3/2002 | Sprehe et al. |
| 6,383,600 B1 | 5/2002 | Johnson |
| 6,422,987 B1 | 7/2002 | Hamm |
| 6,428,642 B1 | 8/2002 | Matthews et al. |
| 6,467,957 B2 | 10/2002 | Yeager |
| 6,499,272 B2 | 12/2002 | Thieman |
| 6,562,165 B1 | 5/2003 | Bauman et al. |
| 6,918,234 B2 * | 7/2005 | Thomas et al. ............ 53/450 |
| 2002/0017078 A1 | 2/2002 | Thieman |
| 2002/0023321 A1 | 2/2002 | Clune |
| 2002/0037115 A1 | 3/2002 | Kinigakis et al. |
| 2002/0152719 A1 | 10/2002 | Kinigakis et al. |
| 2002/0152720 A1 | 10/2002 | Kinigakis et al. |
| 2002/0152721 A1 | 10/2002 | Kinigakis et al. |
| 2002/0154836 A1 | 10/2002 | Kinigakis et al. |
| 2002/0178693 A1 | 12/2002 | Kinigakis et al. |
| 2003/0050167 A1 | 3/2003 | Kinigakis et al. |
| 2003/0074861 A1 | 4/2003 | Thieman |

FOREIGN PATENT DOCUMENTS

| | | |
|---|---|---|
| EP | 0528721 A1 | 2/1993 |
| EP | 0647415 A1 | 4/1995 |
| EP | 0792802 A1 | 9/1997 |
| FR | 1564039 | 4/1969 |

OTHER PUBLICATIONS

"Die" Merriam-Webster Online Dictionary. 2005. Http://merriam-webster.com (May 23, 2005).

* cited by examiner

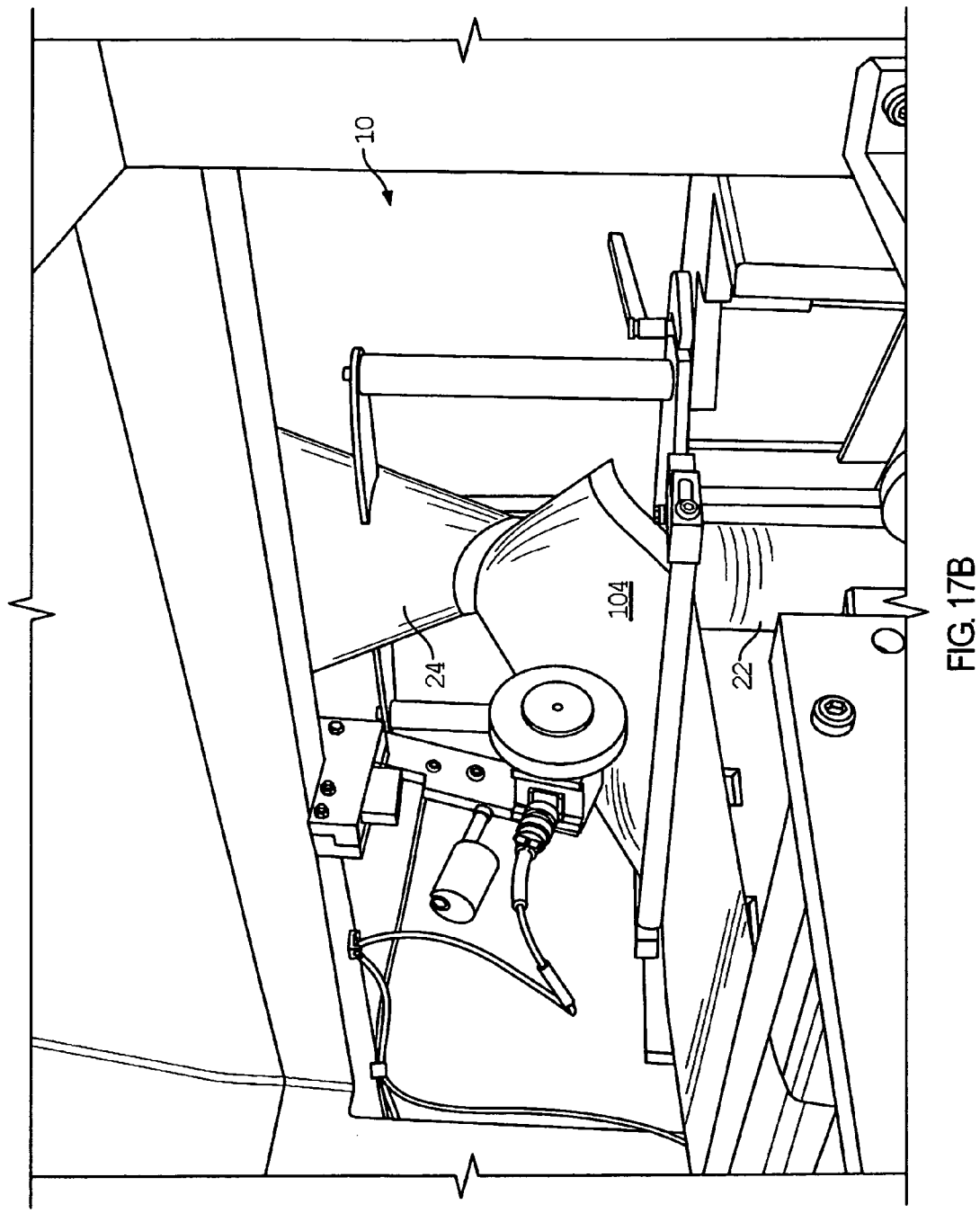

METHOD OF SEALING RECLOSABLE FASTENERS

CROSS-REFERENCE TO RELATED APPLICATION

This application is a divisional of application Ser. No. 10/286,645, filed Nov. 2, 2002, now U.S. Pat. No. 7,067,037, entitled "MODULAR RECIPROCATING HEAT SEAL JAW ASSEMBLY" which is a continuation-in-part of U.S. patent application Ser. No. 09/415,696 filed Oct. 12, 1999, now abandoned, and of U.S. patent application Ser. No. 10/039,527, now U.S. Pat. No. 6,863,754, filed Nov. 7, 2001.

FIELD OF THE INVENTION

The present invention relates generally to reclosable thermoplastic containers and more particularly to an apparatus for sealing reclosable fastener strips to a web of thermoplastic film and for forming the web of thermoplastic film and fastener strips into a reclosable plastic container.

BACKGROUND OF THE INVENTION

As disclosed in U.S. Pat. No. 6,361,212, a top opening reclosable bag is shown in which fastener strips are sealed on a sheet or web of plastic film in bag-length intervals, the sheet is formed into a tube, sealed along its longitudinal edges. However, an apparatus for sealing the reclosable fasteners is not disclosed. A wide variety of patents are directed to the manufacture of reclosable thermoplastic containers on a form-fill-seal machine. For example, U.S. Pat. Nos. 4,617,683 and 4,655,862, inventor Christoff, are directed to transverse application of fastener profile on a web material for subsequent use on a form-fill-seal machine. Similarly, U.S. Pat. No. 4,709,533, inventor Ausney, is also directed to a method and apparatus for forming a vertical tubular form-fill package. U.S. Pat. No. 4,790,126 is directed to a fill and seal machine for reclosable bags, inventor Boeckman. U.S. Pat. No. 4,909,017, McMahon, is directed to a reclosable bag material and a method and apparatus for manufacturing material and for use in the subsequent form-fill-seal machine.

Also shown in U.S. Pat. No. 6,350,340, inventor James R. Johnson, is a method of manufacturing a web of thermoplastic film having a series of reclosable fasteners disposed thereon on one side. The web with the fasteners thereon is subsequently fed into a form-fill-seal machine, sealed along the longitudinal edges of the film to form a tube, across the open end. The film is then sealed to the back edge of the fastener profile. The film is then cross sealed again to form a sealed package containing product therein.

A continuing problem with the above-listed systems is the coordination of the top seal with the mechanism for sealing the back surface of the fastener profile to the film. In addition, although form-fill-seal machines are widely used, the addition of fastener profiles thereon requires the addition and installation of complex equipment which is relatively difficult to adjust.

Accordingly, it is an object of the present invention to provide an apparatus for cross-sealing tubes of thermoplastic film having a series of reclosable fastener profiles sealed thereon and to provide an apparatus for sealing the back edges of the fastener profile to the film, all in a modular system.

It is an additional object of the present invention to provide such an apparatus that can be used for sealing top and bottom seals sequentially on a form-fill-seal machine.

An additional object of the present invention is to provide a seal configuration for top opening containers which provides air-tight seal of the reclosable fasteners to the film while not sealing the opposing sides of the tube of plastic film together.

SUMMARY OF THE INVENTION

A novel reciprocating heat seal jaw assembly is disclosed for sealing reclosable fastener strips to a web of thermoplastic film and for sealing the web of thermoplastic film into a series of reclosable bags. The jaw assembly includes the first and second sealing jaws slidably mounted on a pair of parallel shaft members. The shaft members are mounted near the ends of each of the sealing jaws in a substantially horizontal plane. A mechanism is provided for effecting reciprocal movement of the jaws together and apart as required and the jaws are mounted in modular frame for supporting the jaws and the shaft members and for maintaining the lateral and vertical position of the jaws. In a preferred embodiment, the mechanism before it selectively effecting reciprocal movement of the jaws together and apart comprises one or more reciprocal drive mechanisms. A first drive shaft extends laterally from the drive mechanism. At least a pair of drive arms are connected to the drive shaft, one on each end, and are pivotally attached to the first and second sealing jaws for effecting the selective reciprocal movement of the sealing jaws. The parallelity of drive arms include a right rotating drive arm having the first drive shaft fixedly attached thereto at the midpoint of the drive arm so as to allow rotation of the right rotating drive arm. A left rotating drive arm is also provided having the first drive shaft fixedly attached thereto at the midpoint of the left rotating drive arm, again allowing rotation of the left rotating drive arm. An outer linear drive arm is pivotally connected to the right rotating drive arm near the distal end of the right rotating drive arm and pivotally connected to the first sealing jaw near the first lateral end. An outer left linear drive arm similarly is pivotally connected to the left rotating drive arm and is pivotally connected to the first sealing jaw near the second lateral end thereof. The first and second lateral ends of the first sealing jaw correspond to the left and right ends of the sealing jaw. As a result, when the first drive shaft is rotated, it causes the left and right outer linear drive arms to be selectively moved in the direction of the first sealing jaw for the first 180 degrees of rotation and then pulled in a direction away from the first sealing jaw in the second 180 degrees of rotation, thereby causing the first sealing jaw and second sealing jaw to slide either towards or from each other on the parallel shafts.

The heat seal jaw assembly further includes a right inner drive arm pivotally connected to the right rotating drive arm near a second or left distal end thereof. The right inner drive arm is pivotally connected at its opposite end to the second sealing jaw proximate a first or right end thereof. A left interlinear drive arm is pivotally connected to the left rotating drive arm near a second distal end thereof. The left inner drive arm is pivotally connected at its opposite end to the second sealing jaw proximate a second or left lateral end thereof. As a result, when the first drive shaft is rotated, it causes both the right and left inner linear drive arms to be selectively moved in the direction of or away from the second sealing jaw along the shafts simultaneous with and opposite to the movement of the left and right outer drive arms thereby selectively opening and/or closing the first and second sealing jaws.

The preferred embodiment of the reciprocal drive mechanism previously mentioned is an air cylinder having a plurality of airlines extending therefrom connected at first and second connectors to the air cylinder and having a source of pressurized air connected to the airlines. The air cylinder is constructed and arranged to rotate the first drive shaft in the first desired direction and to a selected degree of rotation when air is introduced into first one of the connectors. The first drive shaft maybe rotated in the opposite direction to an opposite degree of rotation when air is introduced to a second one of the connectors which causes the left and right drive arms to effect horizontal movement of the first and second sealing jaws either together or part, as desired. The jaw assembly further includes a second pair of parallel shaft members disposed in a substantially horizontal plane parallel to the first pair of parallel shaft members. The second pair of parallel shafts is attached to the third and fourth sealing jaws near the lateral ends thereof whereby greater stability is provided during movement of the third and fourth sealing jaws and greater precision is provided in positioning the third and fourth sealing jaws during sealing of the reclosable fastener strips to the web of the thermoplastic film.

In a preferred embodiment, the mechanism for reciprocal movement of the third and fourth sealing jaws includes a second air cylinder having at least two air lines extending therefrom and connected thereto at first and second connectors. A source of pressurized air is connected to the airlines. A second drive shaft extends from the lateral ends of the second air cylinder. A second right rotating drive arm is attached to the second drive shaft at the right end thereof connected to the mid-point of the second right rotating arm. A second left rotating drive arm is attached to the left end of the second drive shaft and at the mid-point of the second left rotating drive arm. A second right outer drive arm is pivotally attached at its proximal end to the second right rotating drive arm at its distal end to the third sealing jaw. A second left outer drive arm is pivotally attached at its proximal end to the second left rotating drive arm and at its distal end to the third sealing jaw. A second right inner drive arm is pivotally attached at is proximal end to the second right rotating drive arm and at its distal end to the fourth sealing jaw. A second left inner drive arm is pivotally attached at its proximal end to the second left rotating drive arm and at its distal end to the third sealing jaw. A second right inner drive arm is pivotally attached at its proximal end to the second right rotating drive arm and at its distal end to the fourth sealing jaw. A second left inner drive arm is pivotally attached at its proximal end to the second left rotating drive arm and at its distal end to the fourth sealing jaw. The second air cylinder is constructed and arranged to rotate the second drive shaft and the first desired direction for a selected degree of rotation when the air is introduced into a third one of the connectors and for rotating the second drive shaft in the opposite direction to an opposite degree of rotation when air is introduced into a fourth one of the connectors. As a result, the second left and right outer drive arms effect horizontal movement of the third sealing jaw and the second left and right inner drive arms effect horizontal movement of the fourth sealing jaw so as to bring the third and fourth sealing jaws together or to separate them as required. In a preferred embodiment, reciprocal movement of the first and second sealing jaws brings them into an abutting position in which the web of thermoplastic material is cross sealed and a second separated position which allows the web of thermoplastic material to be advanced between the first and second sealing jaws.

In a preferred embodiment, the pivotal attachment mechanism of the first and second sealing jaw includes a first pair of ball joints mounted proximate the lateral ends of the first sealing jaw and a second pair of ball joints mounted proximate lateral ends of the second sealing jaw. Each of the drive arms is pivotally attached to one of the ball joints at the distal end of each of the drive arms. The ball joints may further include a spring extending axially from the ball joint one of the drive arms extending away through the ball joint and into the spring. One or more lock nuts are threaded onto the end of the drive arms proximate the distal ends thereof so that the drive arms are attached to the ball joint but are vertically and horizontally pivotal. The springs, in addition to holding the drive arms on the sealing jaws, also act as a shock absorber for substantially fixing the axel position of the drive arm relative to the seal jaws while allowing pivotal movement of the drive arm. They also act as a means of providing a controlled compression of the sealing jaws when they are abutting each other, i.e. the drive arms pull the sealing jaws towards each other and the spring resists such compression to a desire degree. The drive arms are preferably comprised of a first rectangular section and a second rod-shaped section extending axially away from the first rectangular section. In a preferred embodiment, the rectangular portion has a bore at is distal end thereof and the rod-shaped section is threadedly contained and affixed in the bore. Each of the drive arms further includes a bore extending through the first rectangular section at the distal end thereof with a fastening mechanism extending through the bore for rotatably connecting the rectangular section to one end of the rotating drive arms. In a preferred embodiment, the fastening mechanism is a bolt extending through bore and through a corresponding bore on the side of the rotating drive arm proximate one end thereof. The bolt has a head for retaining the bolt in the bore and a lock nut on the distal end of the bolt and pivotally attached thereto on the inner surface of the rotating drive arm for rotatably connecting, by means of the nut and bolt, the drive arm to the rotatable drive arm.

In a preferred embodiment, the mechanism for slidably mounting the first and second sealing jaws on the shaft members comprises a plurality of sleeve bearings laterally disposed on the first and second sealing jaws, each of the sleeve bearings also being coaxially disposed about one of the shaft members so that the first and second sealing jaws are slidably supported and maintained in parallel as they are advanced together, or separated apart.

In order to heat the sealing jaws, wires are connected to the sealing jaws and an electric power source is connected to the wires for providing heat. A temperature control mechanism connected to the electric power source measures the temperature of the sealing jaws, heats the sealing jaws and maintains the sealing jaws at a desired temperature.

In order to transmit power from the air cylinders through the drive shafts to the rotating drive arms, a plurality of pivotal bearing blocks are provided on the frame having the drive shafts extending rotatably therethrough for supporting the drive shafts during rotation.

The first and second sealing jaws are sized, constructed and arranged for cross sealing the web of thermoplastic material so as to form a series of bags therefrom. The third and fourth jaws are sized, constructed and arranged for sealing the reclosable fastener strips to one side of thermoplastic web. The modular reciprocating heat seal jaw assembly is preferably installed on a vertical form-fill-seal machine for forming the thermoplastic web into a series of thermoplastic bags having the reclosable fasteners contained therein and heat sealed thereto. The web preferably has a series of reclosable fastener profiles seals sequentially at one side thereon and bag length intervals transfer to the access of the web. The form-fill-seal machine forms the web of thermoplastic film into a tube having reclosable fastener sealed into the inside of one of the two on one side. The third and fourth sealing jaws compress and seal the unsealed side of the reclosable fastener to the thermoplastic web on the inside surface opposite to the original position of the reclosable fasteners. The reclosable fasteners preferably comprise a base and a pair of flanges extending laterally thereof and horizontally therefrom and a pair of upwardly extending closure members extending from the base. A second reclosable fastener profile having a base and a pair of flanges extending laterally and horizontally therefrom and a pair of upwardly extending closure members is provided. The closure members from the first and second reclosable fastener profiles are selectively interlockable so as to form an air and water tight seal and manually separable, as required.

A perforation knife is affixed to the third and fourth sealing jaws for perforating the web of thermoplastic material so as to allow selective manual access to the reclosable fastener within the bag, thereby allowing separation of the closure elements and access to the interior bag.

The third and fourth sealing jaws each comprise a pair of rectangular side seal surfaces vertically sized, disposed and separated by sufficient distance to seal the lateral flanges of the fastener profiles to the web without interfering with the interlocking and disengagement of closure members. A pair of horizontal seal surfaces is sized, disposed and separated at a sufficient distance to seal the horizontal flanges of the fastener profiles to the web again without interfering with interlocking or disengagement of the closure members. Thus, when the third and fourth sealing jaws are brought together and heated, the fastener profiles are sealed to the web.

The invention further includes a method of forming a plurality of bags from a web of thermoplastic material, the web having a series of interlocking fastener profiles sealed to one surface of the web. Each of the bags has a pair of reclosable fastener profiles sealed thereon. The method comprises the steps of longitudinally sealing the ledges of the tube to form a sealed tube, cross sealing the web at bag length intervals above the fastener profiles, sealing the unsealed side of the fastener profiles to the inside surface of the web so as to form an airtight seal of the bag, perforating the surface of the web above the fastener profile so as to provide selective digital access to the profile strips, and cutting and separating the bags from the web. The bags maybe filled with product prior to separation from the web.

BRIEF DESCRIPTION OF THE DRAWINGS

FIGS. 17A, 17B and 17C of the drawings are rear perspective views of a form-fill-seal machine having a modular heat seal jaw assembly of FIGS. 2-7 attached thereon.

DETAIL DESCRIPTION OF THE PREFERRED EMBODIMENT

While the present invention is shown with several specific embodiments, the invention is not limited thereto, except insofar as those who have the disclosure before them are able to make modifications and variations therein without departing from the scope of the invention.

Figure 1:
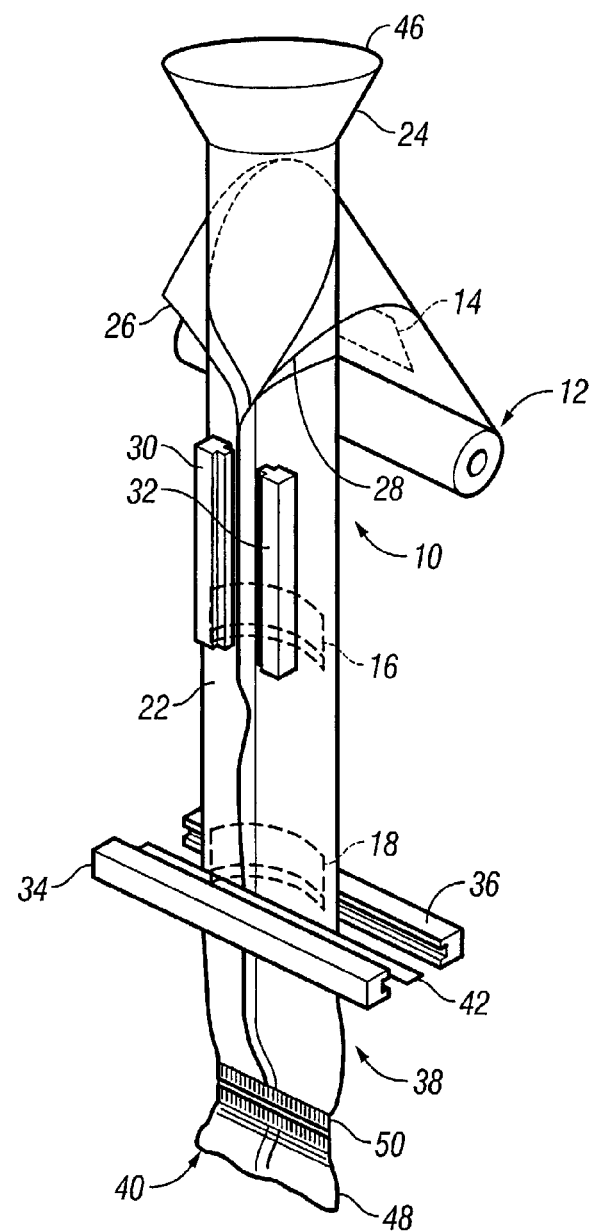
FIG. 1 of the drawings is a front perspective view of a schematic diagram of a vertical form-filled-seal machine.

As shown in FIG. 1 of the drawings, a schematic diagram of a prior art form-fill-seal machine 10. As known in the prior art, a web of thermoplastic material 12 is provided having a series of reclosable fastener profiles such as reclosable fastener profiles 14, 16 and 18 to an outer surface 20 of web 12.

Web 12 is unrolled and formed into a tube 22 around filling tube 24. Once formed into a tube 22, the lateral edges 26 and 28 of tube 22 are sealed together by means of vertical longitudinal sealing jaws 30 and 32. Thereafter, heated cross seal jaws 34 and 36 seal longitudinally across tube 22 so as to form a series of interconnected bags 38 such as bags 38 and 40. In the embodiment shown, a cutting knife 42 was provided within heated cross sealing jaw 34 as to allow separation of bags 38 and 40 after sealing. As commonly known in the prior art, sealing jaws 38 and 40 are also used to grip tube 22 and pull it downwardly around filling tube 24, so as to advance tube 22 and the dispensing of web 12. Filling tube 24 contains an aperture 44 at its top end 46 which is used for dropping product (not shown) through filling tube 24 and into bag 38. After bag 38 is filled, it is advanced downwardly and cross sealed along its top edge 48 simultaneously with sealing of the bottom edge 50 of bag 40.

Figure 2:
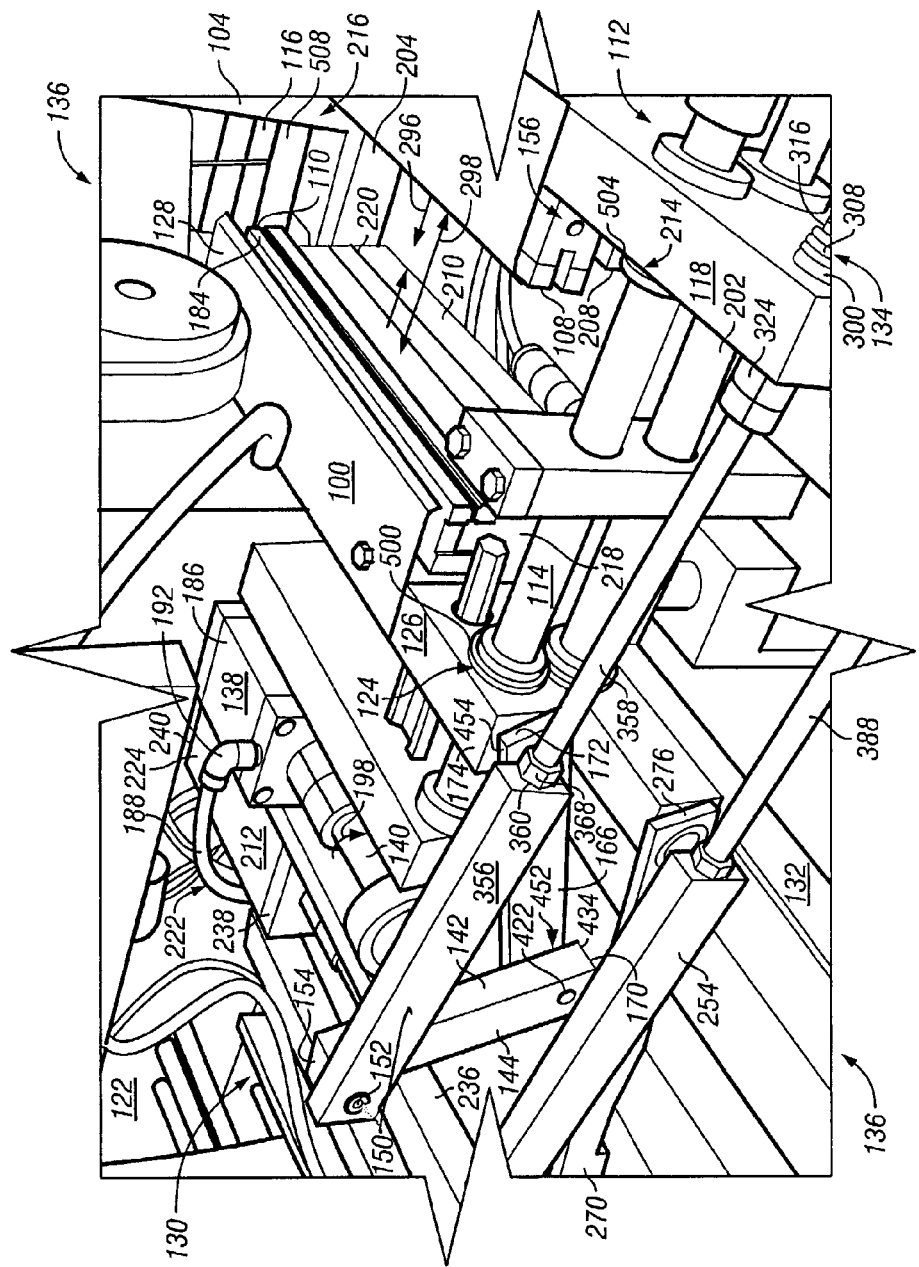
FIG. 2 of the drawings is a front perspective view of a portion of the modular reciprocating detailed jaw assembly of the present invention.
Figure 5:
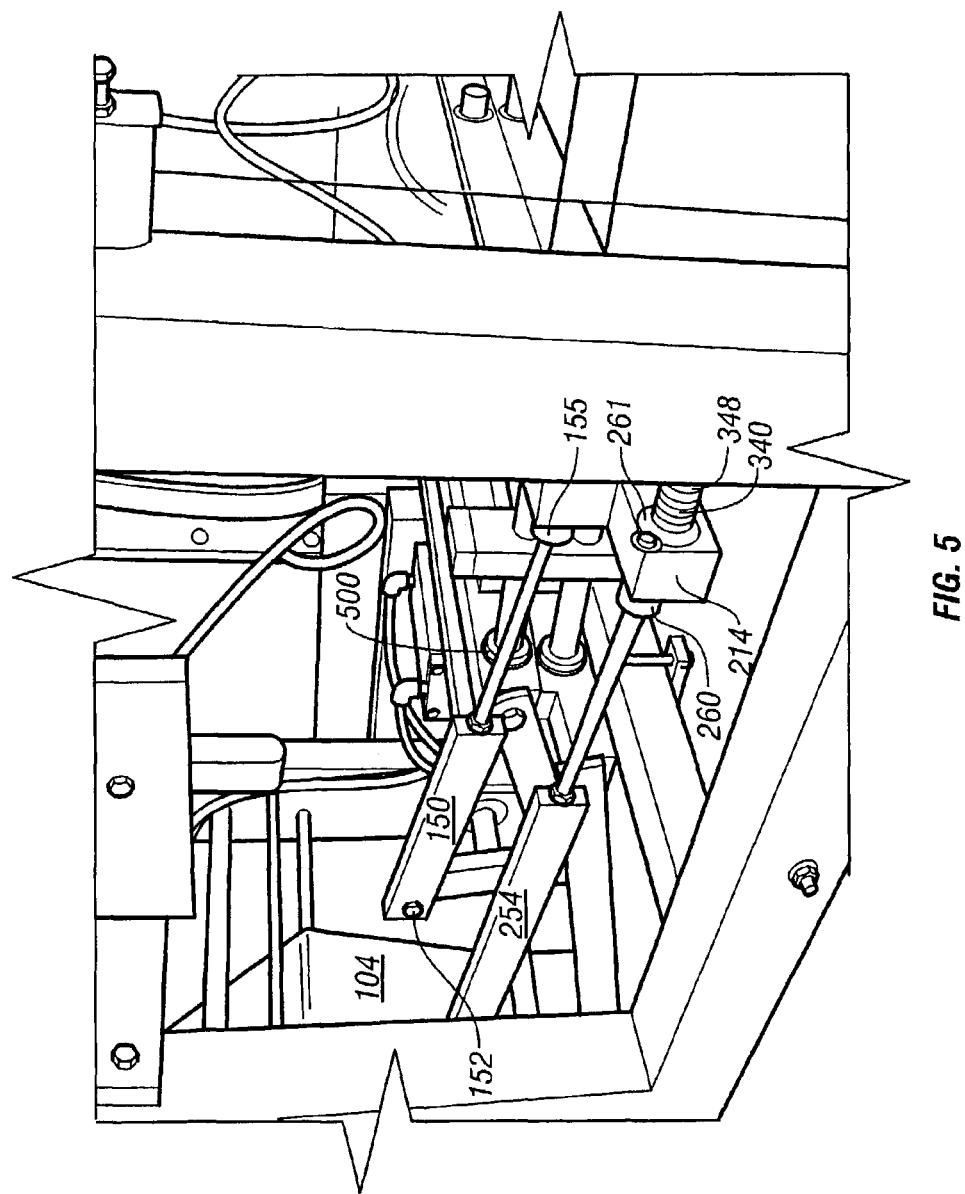
FIG. 5 of the drawings is a side perspective view of the modular reciprocating heat seal jaw assemblies of FIGS. 2, 3 and 4 showing, in particular, the double arm mechanism for a first and second sealing jaws and for a third and fourth sealing jaws.

As shown in FIG. 2 of the drawings, a modular reciprocating heat seal jaw assembly 100 is disclosed. Modular reciprocating heat seal jaw assembly 100 is used for sealing, among other things, reclosable fasteners strips 102, best seen in FIG. 8, to a web of thermoplastic film 104, best seen in FIG. 2. Web 102 is converted into a series of reclosable plastic bags 106, shown in cross section in FIG. 12. The heat seal jaws assembly 100 includes, as shown in FIGS. 2 and 5, first sealing jaw 108, and second sealing jaw 110. Mechanism 112 is provided on a pair of parallel shaft members 114 and 116 proximate to and perpendicular to the lateral ends 118 and 120 of first sealing jaw 108. Shaft members 114 and 116 are disposed in a substantially horizontal plane 122. A mechanism 124 is provided for slidably mounting the second sealing jaw 110 on the pair of parallel shaft members 114 and 116 proximate to and perpendicular to the lateral ends 126 and 128 of the second sealing jaw 110. A mechanism 130 is further provided for selectively effecting reciprocal movement of the first and second sealing jaws 108 and 110 together and apart. By together, we mean towards each other, and by apart, we mean separating from each other. A modular frame 132 is provided for supporting sealing jaws 108 and 110 and for supporting first and second parallel shaft members 114 and 116, thereby maintaining the lateral 134 and vertical 136 position of first and second sealing jaws 108 and 110.

Figure 3:
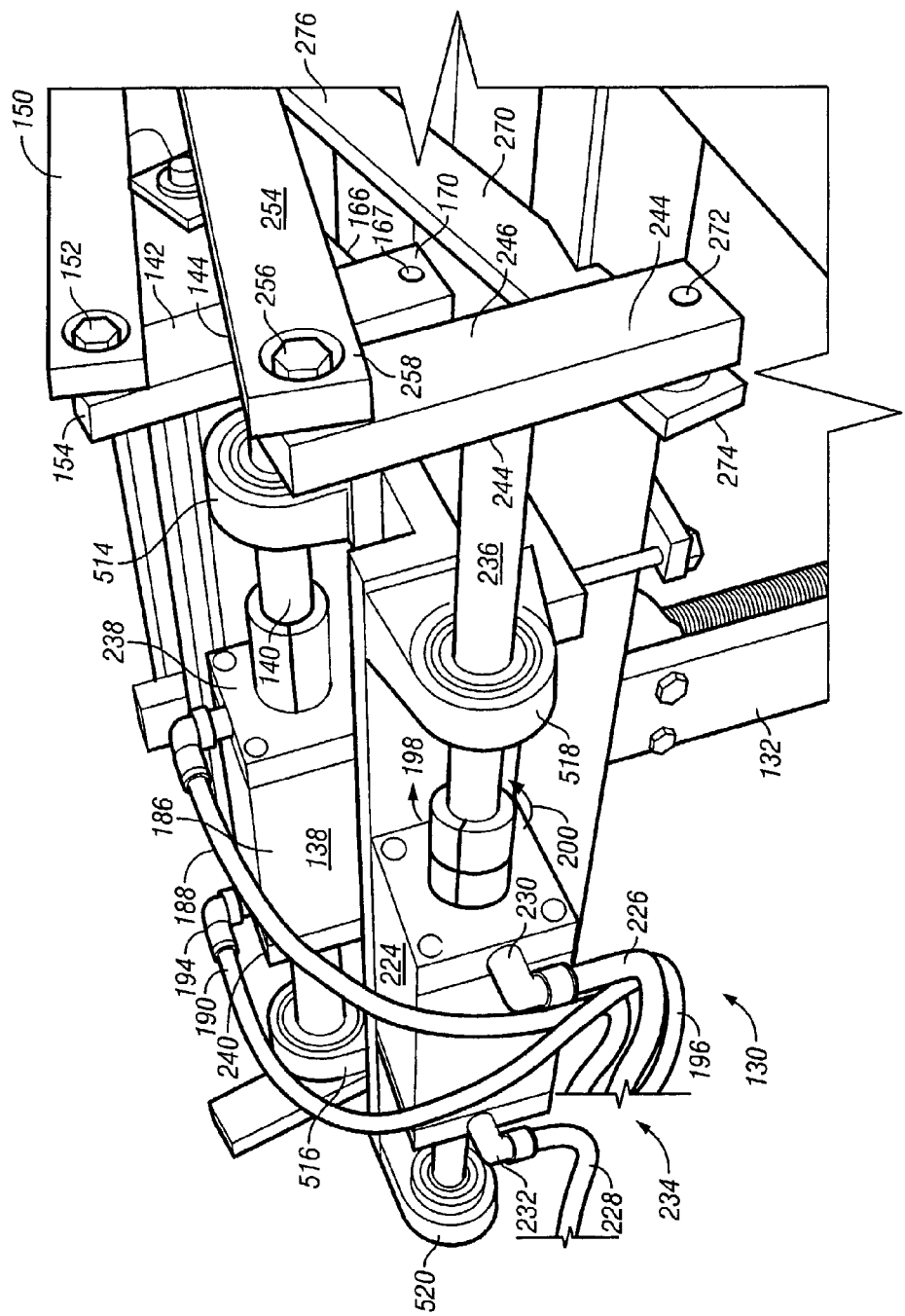
FIG. 3 of the drawings is a rear perspective view of a portion of the modular reciprocating heat seal jaw assembly of FIG. 2.
Figure 4:
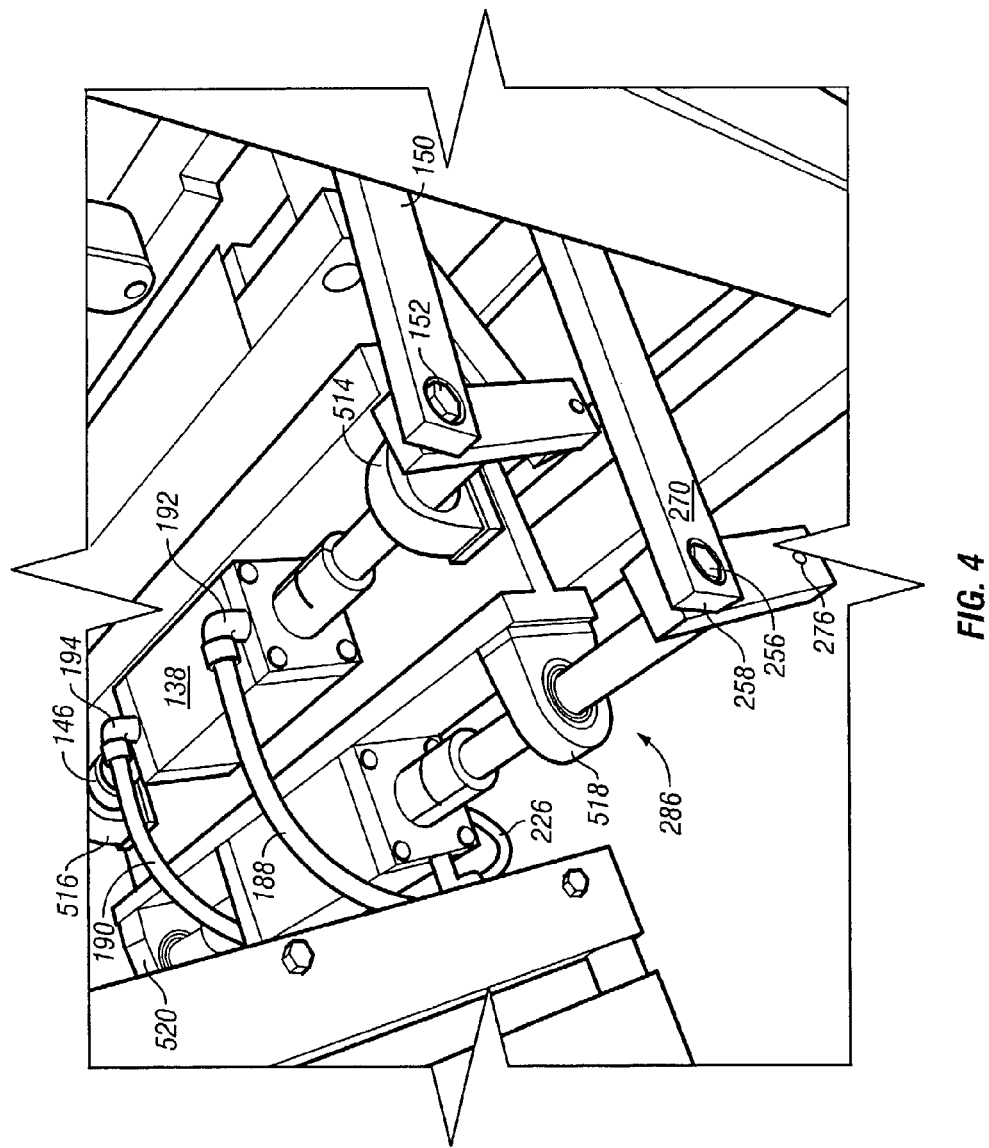
FIG. 4 of the drawings is a top perspective view of a portion of the modular reciprocating heat seal jaw assembly of FIGS. 2 and 3.
Figure 16:
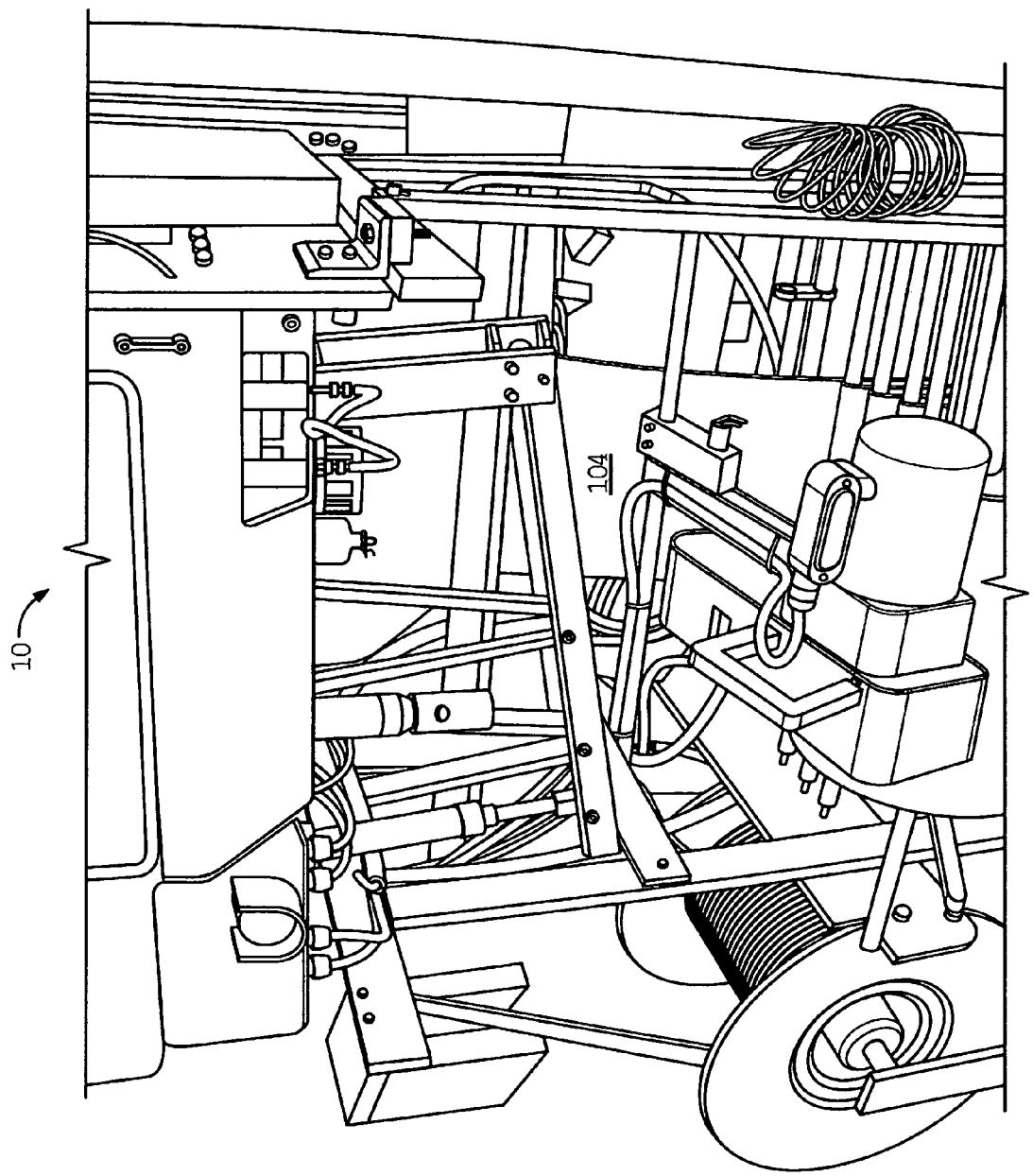
FIG. 16 of the drawings is a rear perspective view of a form-fill-seal machine used with the modular heat seal jaw assembly of FIGS. 2-7.

As best seen in FIG. 3 of the drawings, a reciprocal drive mechanism 138 is used to move first sealing jaw 108 and second sealing jaw 110. A first drive shaft 140 extends laterally from drive mechanism 138. The first reciprocal drive mechanism 138 includes a right rotating drive arm 142 having a first drive shaft 140 is fixedly attached thereto at the midpoint 144 of the drive arm 142 so as to allow rotation of the right rotating drive arm 142. A left rotating drive arm 146 as shown in FIG. 16 of the drawings having first drive shaft 140 fixedly attached thereto at the midpoint 148 of left rotating drive arm 146, which extends parallel to the right rotating drive arm 142. Rotation of first drive shaft 140 thus causes rotation of both right rotating drive arm 142 and left rotating drive arm 146. An outer right linear drive arm 150 is pivotally connected by means of pivotable connection 152 to right rotating drive arm 142 near the first distal end 154 of right rotating drive arm 142 and is pivotally connected at pivotable connection 155 (FIG. 2) to the first sealing jaw 108 near a first lateral end 156 of first sealing jaw 108. An outer left linear drive arm 158 as shown in FIG. 16 of the drawings is pivotally connected at pivotable connection 160 to left rotating drive arm 146 and is pivotally connected at pivotable connection 162 to first sealing jaw 108 near a second lateral end 164 thereof. As a result, upon rotation of first drive shaft 140, left outer linear drive arm 158 and right outer linear drive arm 150 are moved in the direction of first sealing jaw 108, or pulled in the direction away from first sealing jaw 108, causing first sealing jaw 108 and second sealing jaw 110 to slide either towards each other or away from each other on parallel shaft members 114 and 116.

As further seen in FIGS. 2 and 3, modular reciprocating heat seal jaw assembly 100 further includes a right inner linear drive arm 166 pivotally connected at pivotable connection 168 to the right rotating drive arm 142 proximate a second distal end 170. The right inner linear drive arm 166 is pivotally connected at its opposite end 172 at pivotable connection 167 to the second sealing jaw 110 proximate a first lateral end 174 thereof. A left inner linear drive arm 176 as shown in FIG. 16 of the drawings is pivotally connected at pivotable connection 178 through left rotating drive arm 146 near a second distal end 180. The left inner linear drive arm 176 is also pivotally connected at its opposite end 182 at pivotable connection 183 to second sealing jaw 110 proximate or near a second lateral end 184 of second sealing jaw 110. As a result, when first drive shaft 140 is rotated, this causes right inner linear drive arm 166 and left linear drive arm 176 to be moved either in the direction of or in the direction away from second sealing jaw 110 along shafts 114 and 116. This is done opposite to the movement of outer right linear drive arm 150 and outer left linear drive arm 158. As a result, first sealing jaw 108 and second sealing jaw 110 are either moved towards each other until they abut and press against each other or are moved away from each other thereby opening the space between first sealing jaw 108 and second sealing jaw 110.

As best seen in FIG. 3, reciprocal drive mechanism 138 includes an air cylinder 186 having a pair of air lines 188 and 190 extending therefrom and connected thereto at first connector 192 and second connector 194. A source of pressurized air 196 is connected to air lines 188 and 190. Air cylinder 186 is constructed and arranged to rotate first drive shaft 140 in a first desired direction 198 for a selected degree of rotation. In a preferred embodiment first drive shaft 140 is rotated 90 degrees when air is introduced into first connector 192. When the opposite movement is required, first drive shaft 140 is rotated in the opposite direction 200 and to an opposite degree of rotation, again preferably 90 degrees, when air is introduced into the second connector 194. As a result, first drive shaft 140 causes right rotating drive arm 142 and left rotating drive arm 146 to rotate 90 degrees thereby effecting movement of outer right linear drive arm 150 through pivotable connection 152 and movement of outer left linear drive arm 158 as shown in FIG. 16 of the drawings through pivotable connection 160. Similarly, the right inner linear drive arm 166 is caused to move by its pivotable connection to right rotating drive arm 142, and the left inner linear drive arm 176 is caused to move by its pivotable connection 178 to left rotating drive arm 146 thereby causing second sealing jaw 110 to move either towards first sealing jaw 108 or away from first sealing jaw 108, as required.

Returning to FIG. 2, the modular reciprocating heat seal jaw assembly of FIG. 100 further includes a second pair of parallel shaft members 202 and 204 disposed in a substantially horizontal plane 206 which is parallel to the first pair of parallel shaft members. Further provided is a third sealing jaw 208 and a fourth sealing jaw 210. A mechanism 212 is further provided for reciprocal movement of third sealing jaw 208 and fourth sealing jaw 210 either towards or away from each other. The second pair of parallel shafts 202 and 204 are attached to the third and fourth sealing jaws 208 and 210 near the lateral ends 214, 216, 218 and 220 thereof. As a result greater stability is provided during movement of third sealing jaw 208 and fourth sealing jaw 210 and greater precision is provided in positioning of third sealing jaw 208 and fourth sealing jaw 210 during sealing of reclosable fastener strips 102.

As further shown in FIG. 2, parallel shafts 202 and 204 are preferably disposed below parallel to and below first pair of parallel shafts 114 and 116. As a result, greater stability is provided during movement of third and fourth sealing jaws 208 and 210 and greater precision is provided in positioning of third and fourth sealing jaws 208 and 210 during sealing of reclosable fastener strips 102. The mechanism for reciprocal movement 222 of third sealing jaw 208 and fourth sealing jaw 210 includes a second air cylinder 224 having air lines 226 and 228 extending therefrom and connected thereto at third connector 230 and fourth connecter 232. A source of pressurized air 234 is further provided and is connected to air lines 226 and 228. A second drive shaft 236 extends from the lateral ends 238 and 240 of second air cylinder 224. A second right rotating drive arm 242 is attached to the second drive shaft 236 at a right distal end 244 and at the midpoint 246 of the second right rotating drive arm 242. A second left rotating drive arm 248 as shown in FIG. 16 of the drawings is attached to the left distal end 250 of second drive shaft 236 and at the midpoint 252 of second left rotating drive arm 248. A second right outer drive arm 254 is pivotally attached at pivotable connection 256 at its proximal end 258 to second left rotating drive arm 248 and at its distal end 260 by pivotable connection 261 to third sealing jaw 208. A second left outer drive arm 262 as shown in FIG. 16 of the drawings is pivotally connected at pivotable connection 264 at its proximal end 266 and at its distal end 268 by pivotable connection 269 to third sealing jaw 208. A second right inner drive arm 270 is pivotally attached at pivotable connection 272 at its proximal end 274 to the second right rotating drive arm 242 and at its distal end 276 by pivotable connection 277 to fourth sealing jaw 210. A second left inner drive arm 278 is pivotally attached at pivotable connection 280 at its proximal end 282 and at its distal end 284 by pivotable connection 285 to fourth sealing jaw 210. Second air cylinder 224 is constructed and arranged to rotate second drive shaft 236 in a first desired direction 286 for a selected degree of rotation 288, preferably 90 degrees, when air is introduced into third connector 230. For rotating second drive shaft 236 in the opposite direction, the flow of air into third connector 230 is ceased. Air is introduced into fourth connector 232, causing second drive shaft 236 to rotate in the opposite direction 290 and to an opposite degree of rotation, again preferably 90 degrees. It should be understood that, when air is introduced into fourth connector 232, it is simultaneously cut off from introduction into third connector 230. Similarly, when air is introduced into second connector 194, it is simultaneously cut off from introduction into first connector 192. This introduction of air into either the third or fourth connectors causes second left outer drive arm 262 and second right outer drive arm 254 to effect horizontal movement 294 of third sealing jaw 208. Similarly, second left inner drive arm 278 and second right inner drive arm 270 are moved thereby effecting horizontal movement 296 of fourth sealing jaw 210 so as to bring third sealing 208 and fourth sealing jaw 210 either together or to separate them, as required.

Figure 6:
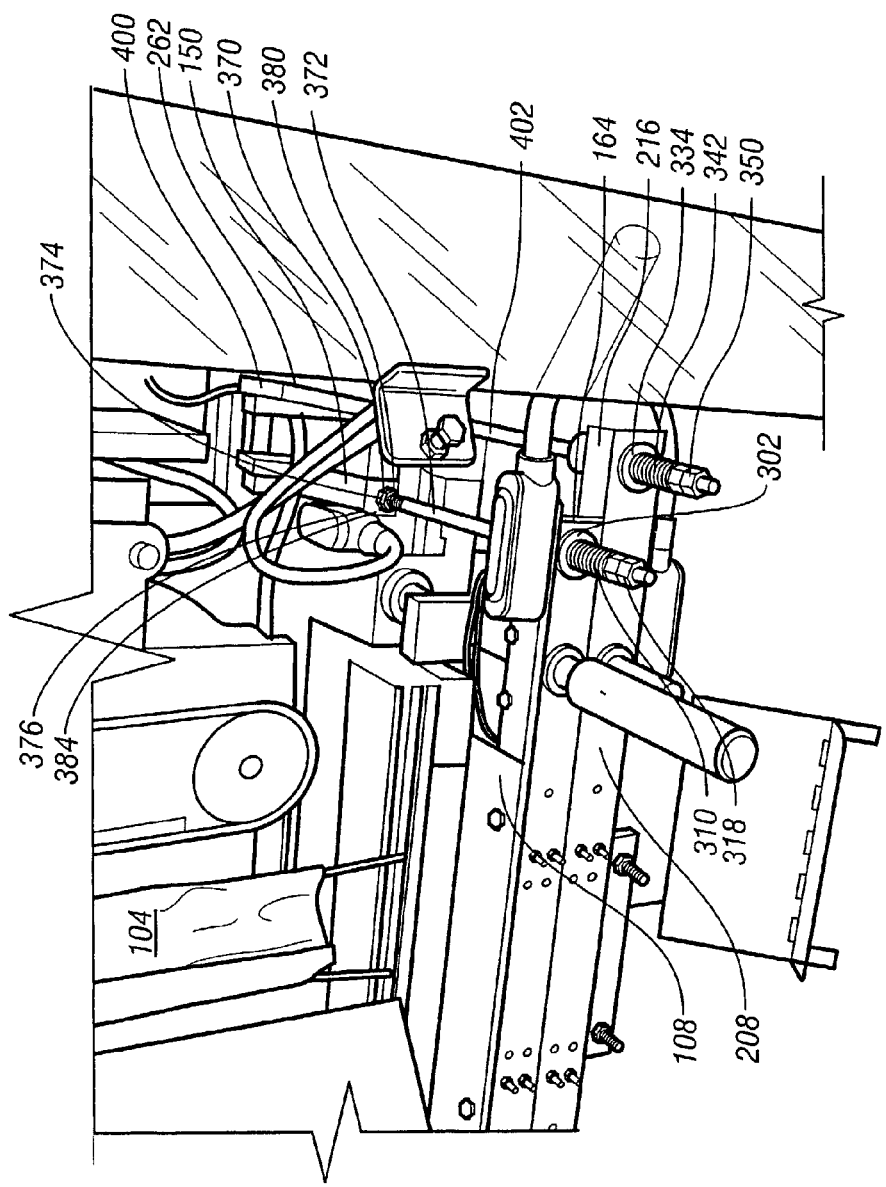
FIG. 6 of the drawings is a side perspective view of the modular reciprocating ECO jaw assembly of FIGS. 2-5 showing, in particular, the jaw assembly mounted on a vertical form-fill-seal machine with a tube of plastic film being disposed vertically and depending downwardly towards the space between the seal and jaws.
Figure 7:
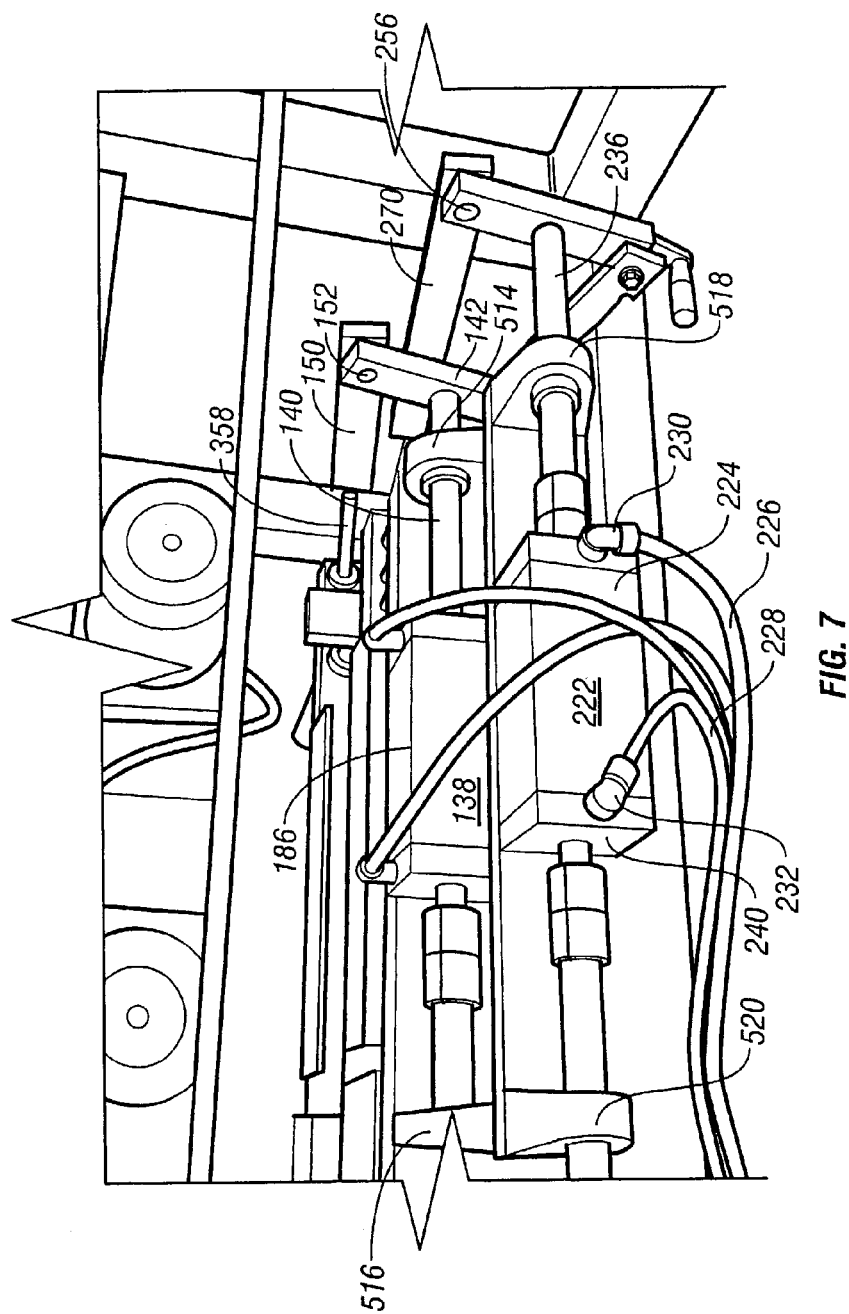
FIG. 7 of the drawings is a rear perspective view of the modular reciprocating heat seal jaw assembly of FIGS. 2-6 showing, in particular, a first reciprocating air cylinder and a second reciprocating air cylinder having a dry shaft extending laterally from either side thereof and a second reciprocating air cylinder having a second drive shaft extending laterally therefrom with drive arms disposed on the distal ends of the first and second drive shafts and inner and outer drive arms pivotally mounted on the distal ends of the rotating drive arms.

As further shown in FIGS. 2 and 6, the modular heat seal jaw assembly 100 includes a mechanism 130 for selective reciprocal movement of first sealing jaw 108 and second sealing jaw 110 together and apart comprises reciprocating the first and second sealing jaws between a first abutting position 296, in which the web of cross thermoplastic material 104 is cross sealed and a second, separated position, best seen in FIG. 2, 298 which allows the web of thermoplastic material 104, best seen in FIG. 6, to be advanced between the first sealing jaw 108 and the second sealing jaw 110.

In a preferred embodiment, first sealing jaw 108 and second sealing jaw 110, when they are abutting in first abutting position 296, have a compressive force of 150 pounds, plus or minus 50 pounds. Further, in order to seal thermoplastic web 104 with a cross seal, first seal jaw 108 and second sealing jaw 110 are heated. First sealing jaw 108 is heated to a temperature of 330°, which is used for heat sealing the back side of the reclosable bags 106. Second sealing jaw 110 is heated to a temperature of 120° for sealing the front side of the bag. A range of between 50° and 400° Fahrenheit can be used depending on the thickness of the film and pneumonic compression applied, as is noted in the Art.

As further seen in FIGS. 2-6 of the drawings, pivotable connections 155 and 162 connect the outer right linear drive arm 150 and the outer left linear drive arm 158 as shown in FIG. 16 of the drawings to first sealing jaw 108. The outer right linear drive arm 150, as mentioned previously, is pivotally connected at pivotable connection 155 to the first sealing jaw 108 near a first lateral end 156. The outer left linear drive arm 158 is pivotally connected at pivotable connection 162 to first sealing jaw 108 near a second lateral end 164. This pivotable connection may be accomplished by means of a first ball joint 300 mounted to a first lateral end 156 of first sealing jaw 108 and a second ball joint 302 mounted on the second lateral end 164 of first sealing jaw 108. Similarly, the right inner linear drive arm 166 is pivotally connected at opposite end 172 at pivotable connection 167 to the second sealing jaw 110 proximate the first lateral end 174 of second sealing jaw 110. The left linear drive arm 176 as shown in FIG. 16 of the drawings is also pivotally connected at its opposite end 182 at pivotable connection 183 to second sealing jaw 110 proximate a second lateral end 184 of second sealing jaw 110. As further seen in FIGS. 2-6, first ball joint 300 has a first spring member 308 extending axially therefrom with outer right drive arm 150 extending through first ball joint 300 and through first spring member 308. Second ball joint 302 has a second spring member 310 extending axially therefrom with out left linear drive arm 158 extending through ball joint 302 and second spring member 310. Lock nuts 316 and 318 are threadably attached to, respectively, the distal end 324 of outer right linear drive arm 150, and the distal end 326 of outer left linear drive arm 158. Lock nuts 316 and 318 are used to compress first spring member 308 and second spring member 310 against first sealing jaw 108. As a result, spring members 308 and 310 tend to act as a shock absorber when compressing first sealing jaw 108 against second sealing jaw 110. As a result, when first sealing jaw 108 and second sealing jaw 110 are butted against each other, spring members 308 and 310 tend to act as shock absorbers and to apply uniform compression of the heat seal jaws 108 and 110 against each other. Further, they tend to align first sealing jaw 108 against second sealing jaw 110 in vertical alignment with each other.

A similar system is utilized for third sealing jaw 208 and fourth sealing jaw 210. As mentioned previously, the distal end 260 of second right outer drive arm 254 is pivotally connected to third sealing jaw 208 by pivotable connection 261. Pivotably connection 261 includes a fifth ball joint 332 mounted near the lateral end 214 of third sealing jaw 208. Similarly, a sixth ball joint 334 is mounted near the opposite lateral end 216 of third sealing jaw 208. The distal end 260 of second right outer drive arm 254 is pivotally connected to third sealing jaw 208 by means of fifth ball joint 332. The distal end 268 of second left outer drive arm 262 as shown in FIG. 16 of the drawings is pivotally connected to third sealing jaw 208 by sixth ball joint 334. Again, a fifth spring member 340 extends axially from fifth ball joint 332 with second right outer drive arm 254 extending through fifth ball joint 332 and through fifth spring member 340. A sixth spring member 342 extends axially from sixth ball joint 334 with second left outer drive arm 262 extending through ball joint 334 and through sixth spring member 342. A fifth lock nut 348 is threadably attached to the distal end 260 of second right outer drive arm 254 which fixedly attaches second right outer drive arm 254 to fifth ball joint 332 but allows it to be vertically and horizontally pivotably therein by means of fifth spring member 340. Similarly, a sixth lock nut 350 is threadably attached to second left outer drive arm 262 near the distal end 268 thereof which fixedly attaches second left outer drive arm 262 to sixth ball joint 334 and to sixth spring member 342, but which allows second left outer drive arm 262 to be vertically and horizontally pivotable therein.

As seen in FIGS. 2-6 of the drawings, outer right linear drive on 150 includes a rectangular section 356 and a rod shaped section 358 extending axially away from the rectangular section 356. Right outer drive linear arm 150 includes a bore 360 extending into the rectangular section 356. In a preferred embodiment, rod-shaped section 358 has threading 362 at its distal end 364. Interlocking threading 366 readily receives the threading 362 on rod shaped section 358 and retains rod-shaped section 358 therein. A lock nut 368 is then threaded onto the threading 362 of rod-shaped section 358 until it abuts against the rectangular section 356 of right outer drive arm 150. Rod-shaped section 358 is thus fixedly attached to rectangular section 356.

Outer left linear drive arm 158 as shown in FIG. 6 of the drawings has a rectangular section 370 and a rod-shaped section 372. Rectangular section 370 has a 374 bore extending axially into it at its distal end 376. Rod-shaped section 372 has threading 378 thereon along its proximal end 380. Similarly, corresponding threading 382 is machined into bore 374. As a result, rod-shaped section 372 may be threadedly engaged into bore 374. A lock nut 384 may then be slid along rod-shaped section 372 and is threadedly engaged on threading 378 until it is in abutment with distal end 376 of rectangular section 370. Rod-shaped section 372 is thus fixedly attached to rectangular section 370.

As further seen in FIG. 2, second right outer drive arm 254 includes a rectangular section 386 and a rod-shaped section 388. The rectangular section has a bore 390 at its distal end 392 which is of sufficient diameter to receive rod shaped section 388. Rod-shaped section 388 at its proximal end 394 has threading 395 thereon which is sized, constructed and arranged for engagement with threading 396 within bore 390. A lock nut 398 is circumferentially disposed about rod-shaped section 388 and is threaded onto threading 394 until it comes into abutment with the distal end 392 of rectangular section 388. Thus, rod-shaped section 388 is fixedly attached to rectangular section 386.

As further seen in FIG. 2, second left outer drive arm 262 as shown in FIG. 6 of the drawings includes a rectangular section 400 and a rod-shaped section 402. Rectangular section 400 has a bore 404 at its distal end 406 which is sized for reception of the proximal end 408. Rod-shaped section 402 has threading 410 thereon which is sized, constructed and arranged for corresponding threading 412. As a result, rod-shaped section 402 may be threadedly engaged into bore 404. A lock nut 414 is circumferentially disposed about rod-shaped section 402 and is moved into threaded engagement with threading 410 on rod-shaped section 402 and engaged therewith until it comes into abutment with and locking engagement with distal end 406 of rectangular section 400. Again, rod-shaped section 402 is thus fixedly attached to rectangular section 400.

The purpose of this combination of a rectangular section and a rod shaped section is to allow the pivotal connection of rectangular sections 356, 370, 386 and 400 with a rotating drive arms 142, 146, 242 and 248. At the same time, rod shaped sections 358, 372, 388 and 402 are constructed for telescopic engagement into first ball joint 300, second ball joint 302, third ball joint 304 and fourth ball joint 306. This allows transformation of rotational movement to linear movement and reduces the amount of space required and material for performing this linear motion.

As further seen in FIG. 2, rectangular section 356 of right outer linear drive arm 150 has a lateral bore 416 extending horizontally therethrough at the proximal end 418 of the rectangular section 356. The fastening mechanism 420 is used to pivotally attach proximal end 418 of rectangular section 356 to T.L. right rotating drive arm 142. Fastening mechanism 420 includes a bolt 422 extending through lateral bore 416, and through a corresponding bore 424 in right rotating drive arm 142 near one end 426 thereof. A lock nut 428 on the distal end 430 of bolt 422 is positioned on the inner surface 434 of right rotating drive arm 142 and a lock thereon so as to pivotally attach a right rotating drive arm 142 to outer right linear drive arm 150.

Similarly, a second end 434 of right rotating drive arm 142 has a lateral bore 436 extending therethrough. A bolt 438 is telescopically received in lateral bore 436 and extends through a similar bore 450 in the proximal end 452 right inner linear drive arm 166. While the use of a lock nut 428 is disclosed, bolt 438 or any of the bolts described above can be fixedly attached to right rotating drive arm 142 and rotably mounted within respectively right linear drive arm 150 or right inner linear drive arm 166. In either case, rotation of right rotating drive arm 142 will cause linear movement forward or back of outer right linear drive arm 150 and right inner linear drive arm 166.

Right inner linear drive arm 166, at its distal end 454 may be pivotally mounted to first sealing jaw 108 at its lateral end 156. A bolt 456 extends through the bore 450 at the distal end 454 of right inner linear drive arm 166 and into the lateral end 156 of first sealing jaw 108, and is rotably mounted therein. Bolt 456 is fixedly attached to distal end 454 of right inner drive arm 166. As a result, when a right inner linear drive arm 166 is moved forward it causes forward linear motion of first sealing jaw 108 and when it is reversed it pulls first sealing jaw 108 away from second sealing jaw 110.

Similar in construction is the system for pivotal connection of outer left linear drive arm 158, inner left linear drive arm 176, left rotatable drive arm 146 and second lateral end 164 of first sealing bar 108. Left outer drive arm 158 has a bore 458 extending therethrough as does left rotating drive arm 146 as shown in FIG. 16 of the drawings. A bolt 460 extends through left rotating drive arm 146 and through left outer linear drive arm 158. Bolt 460 has a head 462 thereon for retaining it in bore 458. Bolt 460 may either have threading 464 at its end thereon and a lock nut 466 fixedly attached thereto, or bolt 460 may be fixedly attached in bore 458 so that lateral movement of left linear drive arm 158 is not possible but pivotal movement is. Similarly, a bore 468 is formed in the second lateral end 470 of left rotating drive arm 146 which is aligned with a bore 472 in left inner linear drive arm 176. A bolt 474 extends through bore 472 and bores 468 with a head 476 at the outside end 478 thereof. A lock nut 480 may be fixedly attached to the threading 482 on bolt 474 rotatably attaching left inner linear drive arm 176 to left rotating drive arm 146.

A similar system of bolts, bores and lock nuts is utilized in second right outer drive arm 254, second left outer drive arm 262, second right inner drive arm 270 and second left inner drive arm 278.

As previously mentioned, first sealing jaw 108 and second sealing jaw 110 are slidably mounted on first shaft member 114 and second shaft member 116. This slidable mounting is accomplished by means of sleeve bearings 500 and 502 in first sealing jaw 108 and sleeve bearings 504 and 506 in second sealing jaw 110. Sleeve bearings 500-506 are co-axially disposed about the shaft members respectively 114 and 116 so that first sealing jaw 108 and the second sealing jaw 110 may be slidably supported and maintained in parallel as they are advanced together or apart. It is further seen in FIGS. 2-6, a plurality of wire members 508 are connected to respectively first sealing jaw 108 and second sealing jaw 110. An electric power source 510 is connected to the wire member 508 so as to provide means for heating sealing jaws 108 and 110. A temperature control mechanism 512 is connected to the electric power source 510 for measuring the temperature of the first sealing jaw 108 and the second sealing jaw 110, heating the sealing jaws to a desired temperature and maintaining the sealing jaws at the desired temperature. In a preferred embodiment the temperature range is preferably between 300° and 350° which may be modified or controlled by the temperature controller 512 to a range of between 50° and 400°, as required.

As further seen in FIGS. 2-6, a parallelity of pillow bearing blocks 514, 516, 518 and 520 are provided on frame 132 having first drive shaft 140 and second drive shaft 236 extending respectively through a pair of said pillow bearing blocks. Pillow bearing blocks support the drive shafts 140 and 236 during rotation.

Figure 9:
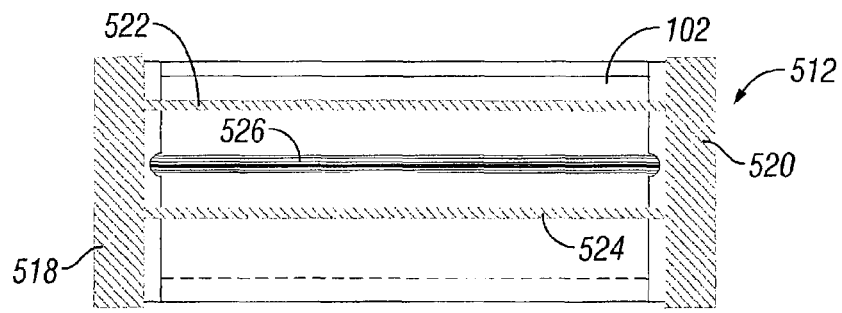
FIG. 9 of the drawings is a top elevational view of the seal configuration of FIG. 8.
Figure 10:
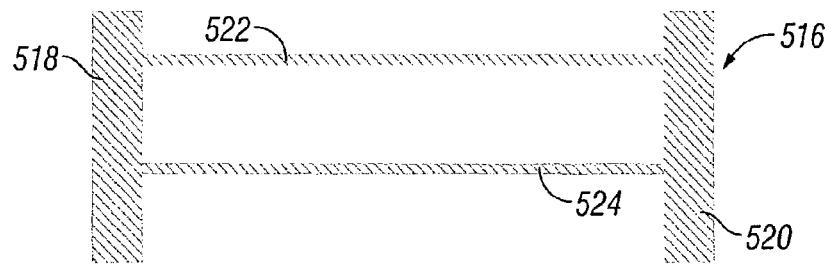
FIG. 10 of the drawings is a side cut-a-way view of a reclosable flexible container manufactured using the vertical form-filled seal apparatus of FIG. 1, showing, in particular, a top seal on a bag, bottom seal on a bag, a pair of fastener profiles interlocked and sealed to the bag walls.
Figure 11:
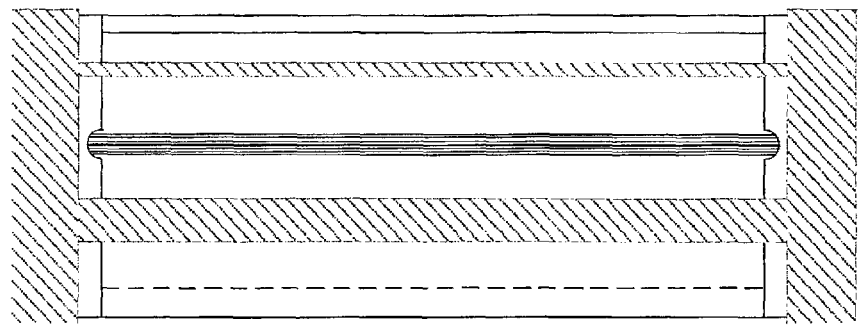
FIG. 11 of the drawings is a top schematic view of the rotating air cylinder, drive shafts, rotating drive arms, inner and outer drive arms and sealing jaws of the modular sealing jaw assembly of FIGS. 2-7.

As seen in FIGS. 2-6, first sealing jaw 108 and second sealing jaw 110 are sized, constructed and arranged for cross sealing the web of thermoplastic material 104. The sealing jaws may be as little as ¼" in width or a parallelity of ribs may be provided for multiple cross seals. The width of the seal is determined by the width of the web of thermoplastic material 104 which again may be as little as 3" or as much as 24" to 36" as required. As further seen in FIG. 2, third sealing jaw 208 and fourth sealing jaw 210 are specifically sized, constructed and arranged for sealing reclosable fastener strips 102 to web of thermoplastic material 104. As previously mentioned, reclosable fastener strips 102 are previously sealed in bag length intervals on the outer surface 20 of web of thermoplastic material 104. After forming the web 104 into a tube 22, and longitudinally sealing it on conventional form-fill sealing equipment, then cross sealing web 104 using first sealing jaw 108 and second sealing jaw 110, third and fourth sealing jaws 208 and 210 are compressed against the outer surface 20 of web of thermoplastic material 104. The temperature on the back side 514 of web of thermoplastic material 104 is heated to a temperature of 330° plus or minus 25° so as to seal the back side of reclosable fastener 102 to the web of thermoplastic material 104. Third sealing jaw 208 and fourth sealing jaw 210 may be heat resistant silicone rubber of 60 diameter for easy release from web 104, and are preferably constructed of aluminum. As shown in FIG. 9, the configuration of third sealing jaw 208 and fourth sealing jaw 210 results in the seal pattern 516 having wider lateral seals 518-520 and narrow cross seals 522 and 524 above and below the interlocking fastener closures 526 and 528 (not shown). The specific seal pattern of third sealing jaw 208 and fourth sealing jaw 210 may be seen in FIG. 10. However, alternate sealing configurations may be utilized, as required.

Figure 8:
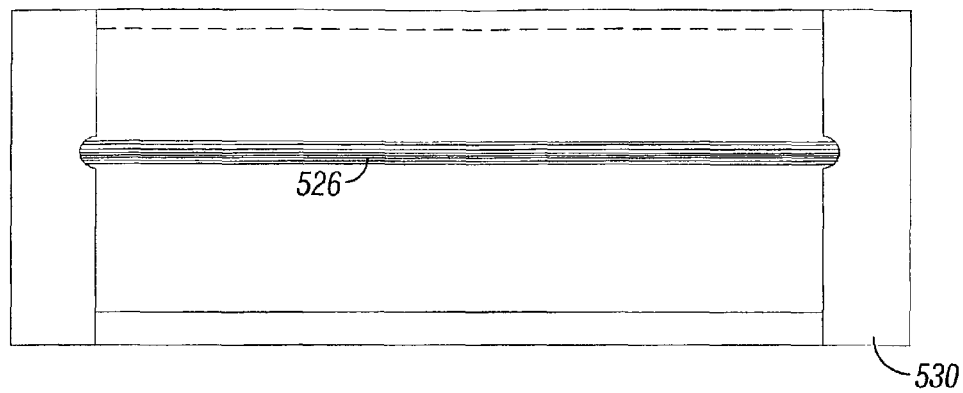
FIG. 8 of the drawings is a top elevational view of a top opening pre-molded fastener segment for use with the reclosable jaw assembly of FIGS. 2-6, showing a vertical seal area overlayed on the lateral ends of the fastener strip and to longitudinal seal strips running parallel to the fastener profile and the fastener strip.
Figure 12:
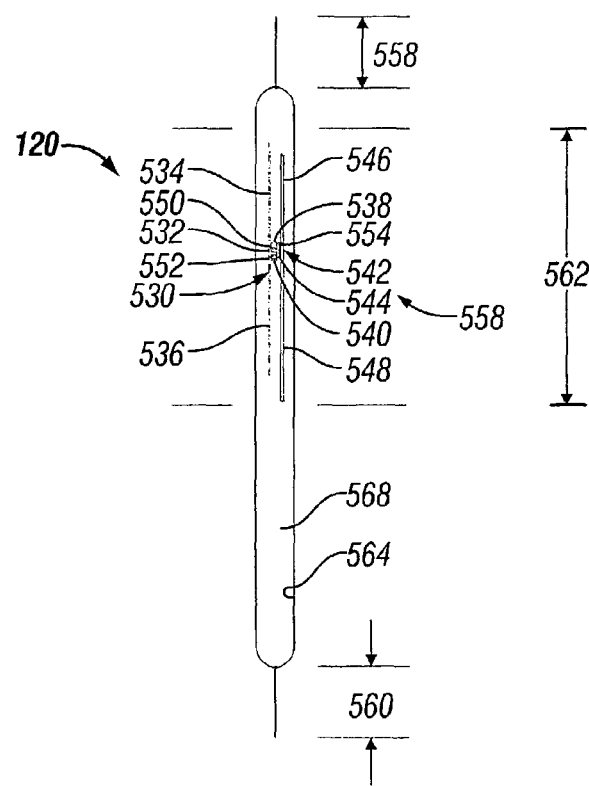
FIG. 12 of the drawings is a front schematic view of the modular jaw assembly of FIG. 7.

As further seen in FIGS. 8 and 12, reclosable fastener strips 102 include a first reclosable fastener 530 having a base 532 and a pair of flanges 534 and 536 extending laterally and horizontally therefrom. A pair of upwardly extending closure members 538 and 540 extending from base 532. A second reclosable fastener profile 542 having a base 544 and a pair of flanges 546 and 548 extending laterally and horizontally therefrom is provided. Second reclosable fastener profile 542 has a pair of upwardly extending closure members 550 and 552. Closure members 538 and 540 are constructed and arranged to digitally interlock with and provide an air tight and water tight seal with upwardly extending closure members 550 and 552. It should be noted in this regard that upwardly extending closure members 538 and 540 are connected to base 532 by means of hinge 554. Similarly, flange 546 extends higher than flange 534 within bag 556. Both the use of hinge 554 and the greater length of flange 546 result in a seal between closure members 526 and 528 with closure members 538 and 540 which is more difficult to open from within bag 556 than by separating flanges 534 and 546. This is called differential opening force and prevents unintended opening of bag 556. As further seen in FIG. 12, bag 556 includes an upper seal 558 and a vertical form fill lower seal 560. These seals are created by heated first sealing bar 108 and heated second sealing bar 110 and applying them to web 104. Third sealing jaw 208 and fourth sealing jaw 210 are applied against top opening jaw seal area 562 so as to seal the base 532 of first reclosable fastener 530 to the inside surface 564 of thermoplastic web 104 which has been formed into bag 556.

Figure 17A:
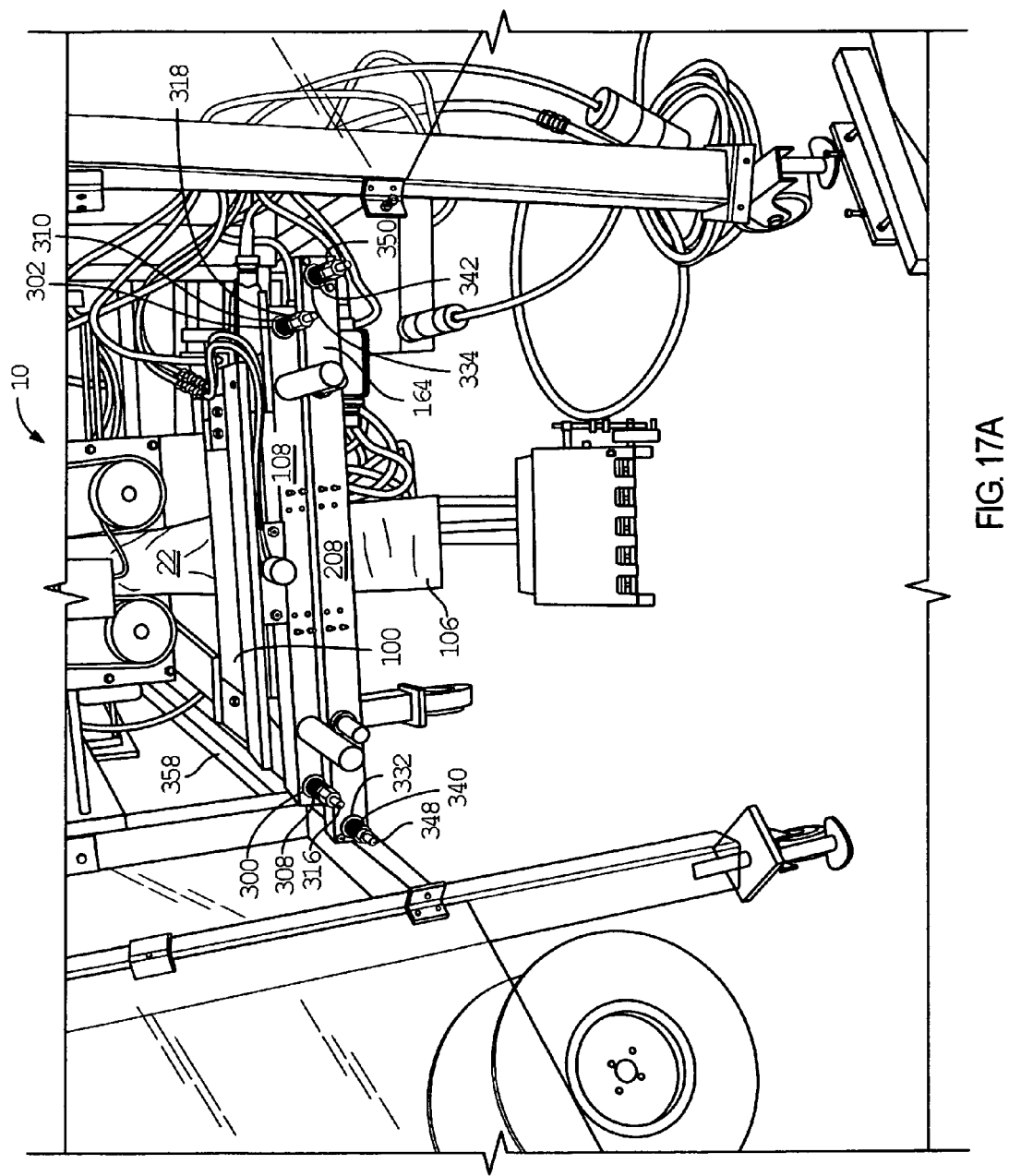
Figure 17C:
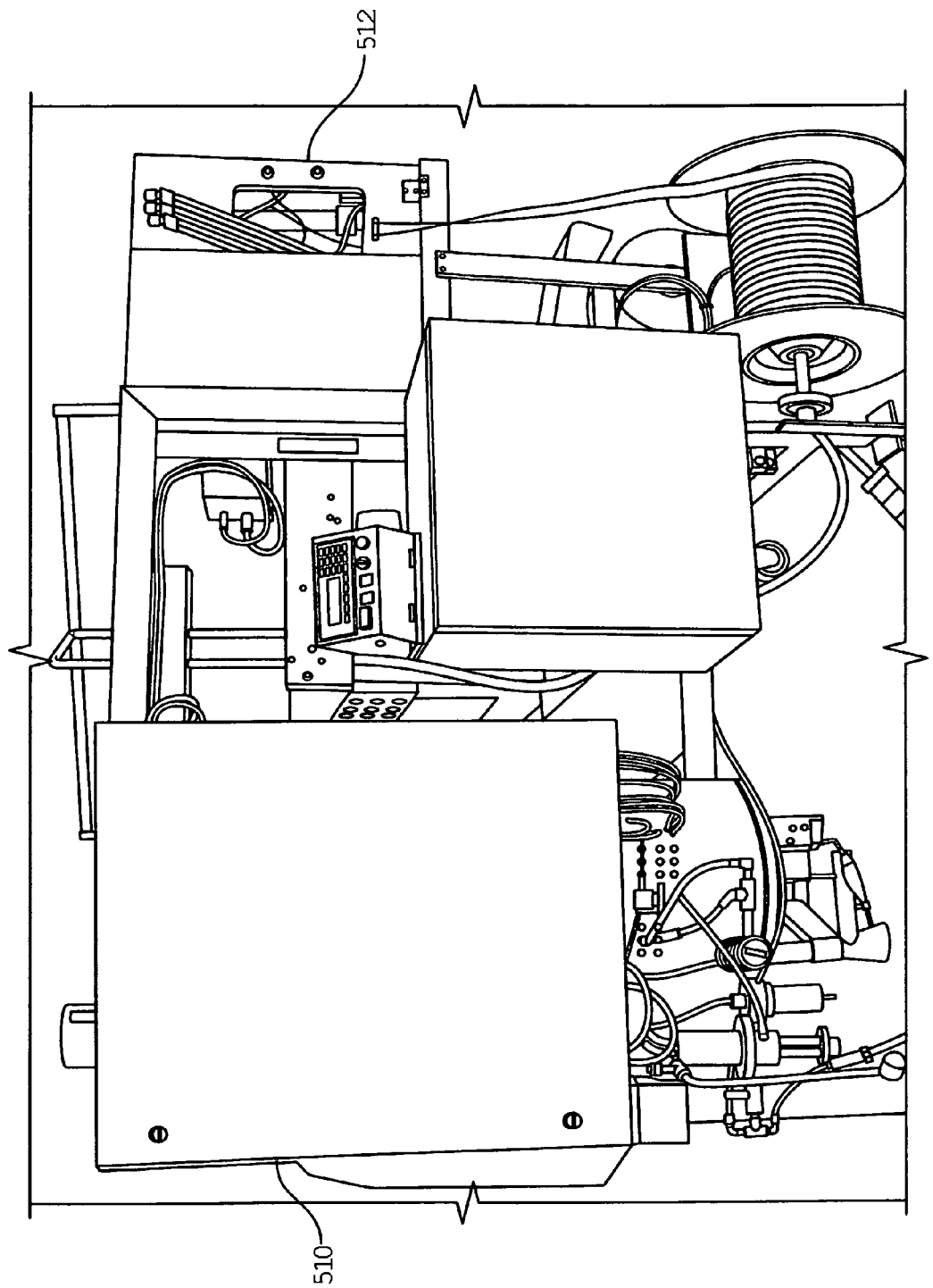
Figure 18A:
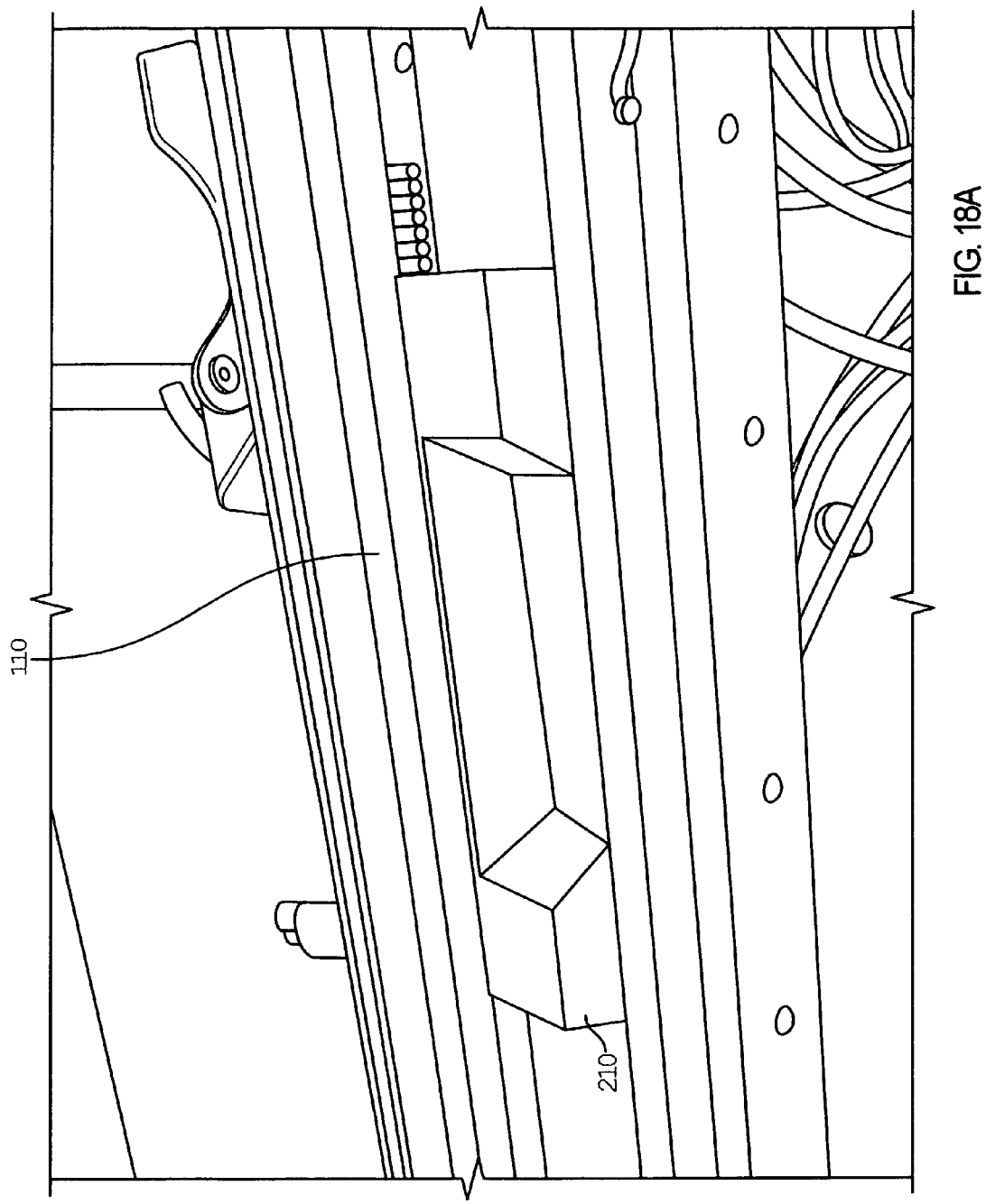
FIGS. 18A and 18B of the drawings are side perspective views, partially broken away of the third and fourth sealing jaws of the modular reciprocating heat seal jaw assembly of FIGS. 16 and 17.
Figure 18B:
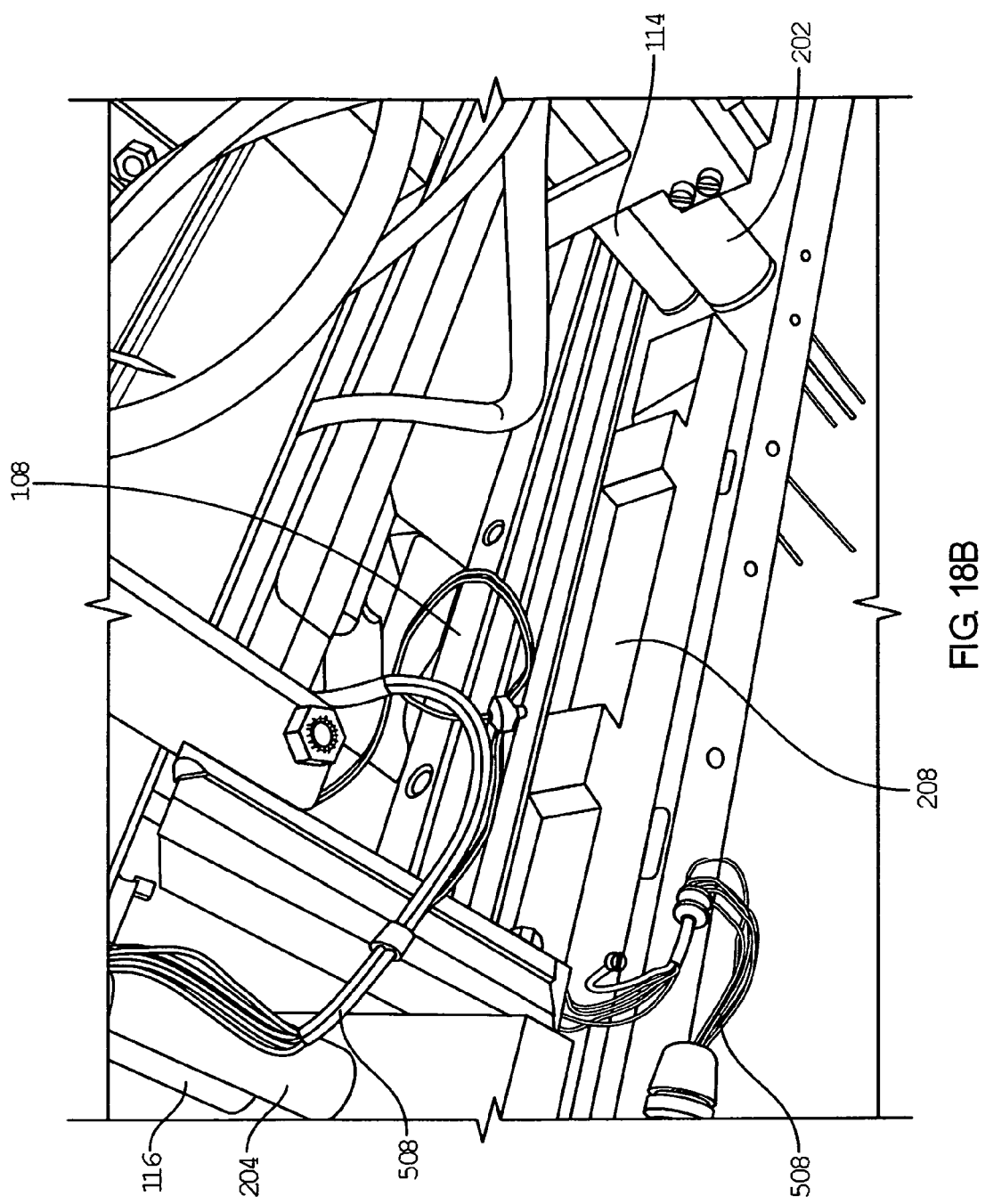

The use of a vertical form-fill-seal machine as shown in FIG. 17 of the drawings to form reclosable bags may be found in U.S. Pat. No. 6,177,172, inventor Yeager, which is incorporated by reference herein.

Returning to FIG. 2 of the drawings, a perforation knife 556 might be disposed in third sealing jaw 208 for perforating web of thermoplastic material 104 so as to allow digital access to first reclosable fastener 530 and second reclosable fastener 542, thereby allowing separation of closure elements 538 and 540 from closure elements 550 and 552 and access to the interior 568 of bag 556.

Its further shown in FIG. 2, in order to separate individual bags such as bag 556 from web thermoplastic material 104, a cutting knife (not shown) is provided which may be mounted on first sealing jaw 108 with an anvil 570 on second sealing jaw 110 for cutting and separating bags 556 from each other.

An additional example of sealing of reclosable fasteners to a web of plastic film may be found in U.S. Pat. No. 6,361,212, assigned to the present applicant which is also incorporated by reference. Further examples of form-filled-seal machines using reclosable fasteners may be found in U.S. Pat. No. 5,461,845 (inventor, Yeager).

Figure 13:
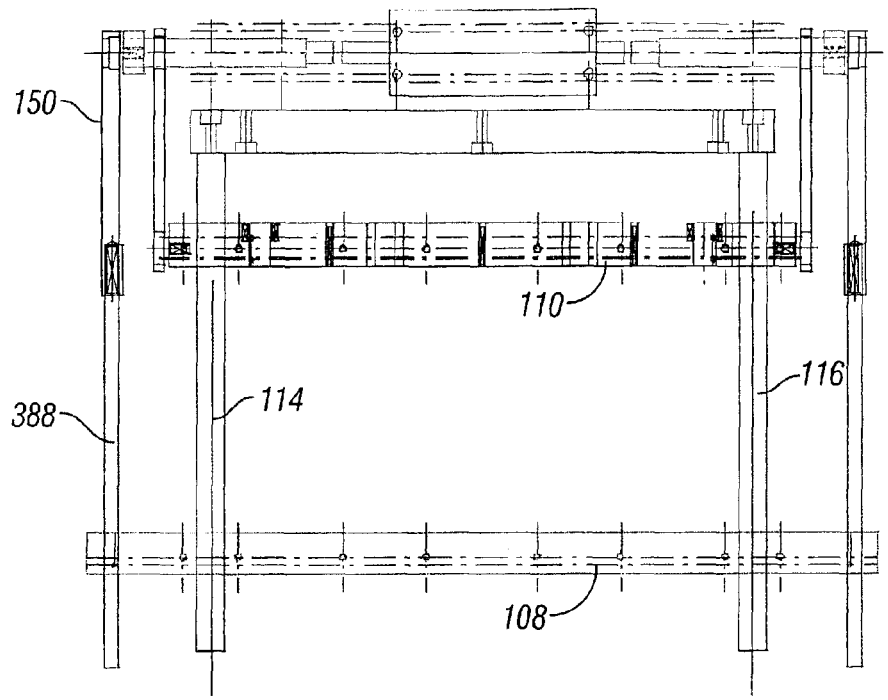
FIG. 13 of the drawings is a side schematic view of the modular jaw assembly of FIGS. 11 and 12.
Figure 14:
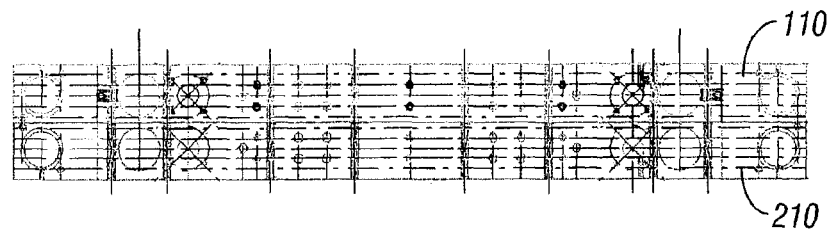
FIG. 14 of the drawings is a front view showing first sealing jaw 108 above third sealing jaw 208 and arms 150, 158 and 254.
Figure 15:
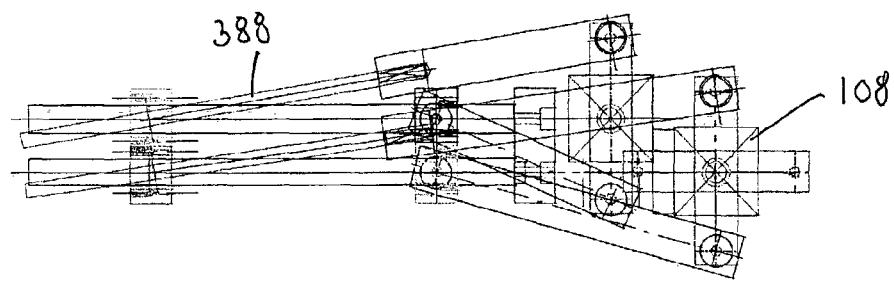
FIG. 15 of the drawings is a side view showing arms 150, 158 and 254 moving first sealing jaw 108, second sealing jaw 110, third sealing jaw 108, fourth sealing jaw 210. One of the keys of the present invention is the movement of sealing jaws 108 and 110, independently of sealing jaws 208 and 210. As a result, more precise sealing of fastener profiles 14, 16 and 18 in proper alignment is provided.

It should be noted that the use of modular reciprocating sealing assembly 100 allows precise placement of third and fourth sealing jaws 208 and 210, resulting in the creation of air tight seals and precise compression of fastener strip 102 in pattern 516. The reciprocate movement of jaws 108, 110, 208 and 210 along shafts 114, 116, 202 and 204 may be seen in FIGS. 13 through 15. The movement of arms 150, 158, 166 and 176 is also shown. The interconnector of the assembly 100 keeps the jaws 108 and 110, 208 and 210 in precise alignment.

What is claimed is:

1. A method of forming a plurality of bags from a web of thermoplastic material formed into a tube having longitudinal edges and having a series of interlocked fastener profiles transversely sealed to one surface of said web, each of said bags having a pair of reclosable fastener profiles sealed thereon, said method comprising the steps of:

performing sequentially the operations of:

longitudinally sealing the longitudinal edges of said tube together to form a sealed tube;

cross sealing said web at bag-length intervals above said fastener profiles;

sealing the unsealed side of one of said fastener profiles to the inside surface of said web so as to form an airtight seal of said bag after the web of thermoplastic material is formed into a tube;

perforating the surface of said web above said fastener profiles so as to provide selective digital access to said profile strips; and cutting and separating said bags from said web.

2. The method of claim 1 and further comprising:

filling said bags with product prior to separation of said bags from said web.

\* \* \* \* \*